US008625444B2

(12) United States Patent
Guo

(10) Patent No.: US 8,625,444 B2
(45) Date of Patent: Jan. 7, 2014

(54) METHOD AND DEVICE FOR ACCESSING AND OBTAINING USER EQUIPMENT CONTEXT AND USER EQUIPMENT IDENTITY

(75) Inventor: Xiaolong Guo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 260 days.

(21) Appl. No.: 12/972,759

(22) Filed: Dec. 20, 2010

(65) Prior Publication Data

US 2011/0090857 A1   Apr. 21, 2011

Related U.S. Application Data

(63) Continuation of application No. PCT/CN2009/072335, filed on Jun. 18, 2009.

(30) Foreign Application Priority Data

| Jun. 18, 2008 | (CN) | 2008 1 0039358 |
| Nov. 3, 2008 | (CN) | 2008 1 0175964 |
| Jan. 5, 2009 | (CN) | 2009 1 0003541 |

(51) Int. Cl.
*H04W 4/00* (2009.01)

(52) U.S. Cl.
USPC .......................................... 370/252; 370/328

(58) Field of Classification Search
None
See application file for complete search history.

(56) References Cited

U.S. PATENT DOCUMENTS

| 5,675,628 | A | 10/1997 | Hokkanen |
| 2008/0268842 | A1* | 10/2008 | Herrero-Veron ........... 455/435.1 |
| 2011/0021194 | A1* | 1/2011 | Gustafsson et al. ....... 455/435.1 |

FOREIGN PATENT DOCUMENTS

| CN | 1567757 A | 1/2005 |
| CN | 101242631 A | 8/2008 |
| CN | 101534500 B | 12/2010 |
| EP | 2214440 A1 | 8/2010 |
| WO | WO2007037284 A1 | 4/2007 |
| WO | WO2008046915 A1 | 4/2008 |
| WO | WO2008/100184 A1 | 8/2008 |
| WO | WO2009/152773 A1 | 12/2009 |

OTHER PUBLICATIONS

"TS 23.401—$3^{rd}$ Generation Partnership Project; Technical Specification Group Services and System Aspects; General Packet Radio Service (GPRS) Enhancements for Evolved Universal Terrestrial Radio Access Network (E-UTRAN) Access (Release 8)," 3GPP Technical Specification, Jun. 2008, V8.2.0, 3GPP, Valbonne, France.

(Continued)

*Primary Examiner* — Alex Skripnikov
(74) *Attorney, Agent, or Firm* — Leydig, Voit & Leydig, Ltd.

(57) ABSTRACT

A method and device for accessing and obtaining UE context and UE identity are provided. The method for access includes: when a UE accesses an SAE network, judging, by a network node, whether a GUMMEI carried by the UE or an MMEGI in the GUMMEI is allocated or mapped by the SAE network; if the GUMMEI or MMEGI is allocated by the SAE network, selecting, by the network node, an MME according to the GUMMEI, or according to the MMEGI and an MMEC, or according to a PLMN-id, the MMEGI and the MMEC; and if the GUMMEI or MMEGI is mapped by the SAE network, selecting, by the network node, an MME according to an MCC, an MNC and an MMEC in the GUMMEI. Therefore, the access of the UE is achieved.

5 Claims, 9 Drawing Sheets

(56) References Cited

OTHER PUBLICATIONS

"TS 24.301—3$^{rd}$ Generation Partnership Project; Technical Specification Group Core Network and Terminals; Non-Access-Stratum (NAS) Protocol for Evolved Packet System (EPS); Stage 3 (Release 8)," 3GPP Technical Specification, May 2008, V0.3.0, 3GPP, Valbonne, France.

"TS 29.274—3$^{rd}$ Generation Partnership Project; Technical Specification Group Core Network and Terminals; 3GPP Evolved Packet System; Evolved GPRS Tunneling Protocol for EPS (GTPv2); Stage 3 (Release 8)," 3GPP Technical Specification, May 2008, V1.0.0, 3GPP, Valbonne, France.

"S2-083236—Change Request 23.401 CR 0304, Version 8.1.0; Mapping Between GUTI and P-TMSI," 3GPP TSG-SA WG2 Meeting #64bis, May 12-16, 2008, 3GPP, Valbonne, France.

"S2-084442—Change Request 23.401 CR 0383; Version 8.1.0; Mapping Between S-TMSI and P-TMSI," 3GPP TSG-SA WG2 Meeting #65, May 12-16, 2008, 3GPP, Valbonne, France.

"Change Request 23.401 CR 0387, Version 8.1.0—P-GW Initiated Bearer Deactivation with ISR Activated, ISR for Rel-8 TAU/RAU Procedures, Encryption for PAP/CHAP Parameters at UE Attach, NAS/AS Interactions and PCC Interaction," 3GPP TSG-SA WG2 Meeting #64, Apr. 7-11, 2008, 3GPP, Valbonne, France.

Extended European Search Report in corresponding European Patent Application No. 12180463.7 (Nov. 15, 2012).

Extended European Search Report in corresponding European Patent Application No. 12180471.0 (Nov. 16, 2012).

"TD S2-084172—Change Request 23.401 CR 0315, Version 8.1.0—ISR Alignments for R8 TAU/RAU Procedures," 3GPP TSG SA WG2 Meeting #64b adhoc, May 7-9, 2008, 3GPP, Valbonne, France.

Extended European Search Report, issued by European Patent Office, dated Sep. 22, 2011, in European Patent Application No. 09765412.3, (7 pages).

3GPP TSG-SA WG2 Meeting #64bis, Munich, Germany, May 12-16, 2008—Change Request 23.401 CR 0304—Current Version 8.1.0 "Mappying between GUTI and P-TSMI," (38 pages).

"3$^{rd}$ Generation Partnership Project; Technical Specification Group Services and System Aspects; General Packet Radio Service (GPRS) enhancements for Evolved Universal Terrestrial Radio Access Network Evolved Universal Terrestrial Radio Access Network (E-UTRAN) access (Release 8)," 3GPP TS 23.401 V8.1.0, Mar. 2008, Global System for Mobile Communications, pp. 1-6, 43-56.

3GPP TSG-SA2 Meeting #65, Prague, Czech Republic, May 12-16, 2008—Change Request 23.401 CR 0318—Current Version 8.1.0. "Editorial Changes—alignment of terms," (12 pages).

International Search Report for International Application No. PCT/CN2009/072335, mailed Sep. 24, 2009 Huawei Technologies Co., Ltd.

Written opinion of the international searching authority of International Application No. PCTCN2009072335, mailed Sep. 24, 2009.

3rd Generation Partnership Project; Technical Specification Group Services and System Aspects; General Packet Radio Service (GPRS) enhancements for Evolved Universal Terrestrial Radio Access Network (E-UTRAN) access (Release 8), Jun. 2008.

3rd Generation Partnership Project; Technical Specification Group Core Network and Terminals; 3GPP Evolved Packet System; Evolved GPRS Tunnelling Protocol for EPS (GTPv2); Stage 3 (Release 8), May 2008.

Extended European Search Report in corresponding European Patent Application No. 12180458.7 (Sep. 4, 2012).

Extended European Search Report in corresponding European Patent Application No. 12180461.1 (Sep. 3, 2012).

Partial European Search Report in corresponding European Patent Application No. 12180471.0 (Sep. 3, 2012).

1$^{st}$ Office Action in corresponding U.S. Appl. No. 13/648,910 (Jan. 18, 2013).

1$^{st}$ Office Action in corresponding Chinese Patent Application No. 201110243345.6 (May 23, 2013).

Notice of Allowance in corresponding U.S. Appl. No. 13/648,910 (Jun. 5, 2013).

1$^{st}$ Office Action in corresponding European Patent Application No. 12180461.1 (Sep. 24, 2013).

1$^{st}$ Office Action in corresponding European Patent Application No. 12180463.7 (Sep. 24, 2013).

23.401 Change Request 0318; S2-083328—Editorial Changes—Alignment of Terms, 3GPP TSG SA2 Meeting #65, May 12-16, 2008, Current Version 8.1.0, 3GPP, Valbonne, France.

* cited by examiner

METHOD AND DEVICE FOR ACCESSING AND OBTAINING USER EQUIPMENT CONTEXT AND USER EQUIPMENT IDENTITY

CROSS-REFERENCE TO RELATED APPLICATIONS

This application is a continuation of International Application No. PCT/CN2009/072335, filed on Jun. 18, 2009, which claims priority to Chinese Patent Application No. 200810039358.X, filed on Jun. 18, 2008, Chinese Patent Application No. 200810175964.4, filed on Nov. 3, 2008, and Chinese Patent Application No. 200910003541.9, filed on Jan. 5, 2009, all of which are hereby incorporated by reference in their entireties.

FIELD OF THE TECHNOLOGY

The present invention relates to the field of communications technologies, and more particularly to a method and a device for accessing and obtaining user equipment (UE) context and UE identity.

BACKGROUND OF THE INVENTION

Existing communication networks include conventional Second Generation (2G) communication networks, 3rd Generation (3G) communication networks, and Long Term Evolution/System Architecture Evolution (LTE/SAE) networks integrated with more advanced technologies. A communication network is generally formed by a Radio Access Network (RAN) and a Core Network (CN). Different communication networks adopt different Radio Access Technologies (RATs) to access the CN, that is, different communication networks have different RANs. For example, a RAN of a 3G communication network is referred to as a Universal Terrestrial Radio Access Network (UTRAN), and a RAN of a SAE communication network is referred to as an Evolved UTRAN (E-UTRAN).

The RAN is formed by RAN nodes, for example, a Radio Network Controller (RNC) and a base station (NodeB) in the UTRAN; and the CN is formed by CN nodes, for example, a Serving General Packet Radio Service (GPRS) Support Node (SGSN) in the UTRAN, or a Mobility Management Entity (MME) in the E-UTRAN. Functions of the MME are to store mobility management context of a user equipment (UE), briefly referred to as UE context, for example, UE identity, mobility management state, and location information.

In the prior art, a RAN node may be routed to a plurality of CN nodes, that is, the RAN node may route an initially accessing UE to different CN nodes. The CN nodes form a Pool. The CN nodes, for example, the SGSNs, in a Pool in a 2G/3G system are identified by Network Resource Identifiers (NRIs), and the CN nodes in a Pool in an SAE system are identified by Globally Unique Mobility Management Entity Identifiers (GUMMEIs).

When a UE accesses a communication network, the communication network allocates a temporary identity to the UE, for example, a 2G/3G system allocates a Packet Temporary Mobile Subscriber Identity (P-TMSI)/TMSI to the UE, while an SAE system allocates a Global Unique Temporary Identity (GUTI) to the UE, where the GUTI contains a GUMMEI. Since the UE may move between different communication networks, when the UE is handed over from the original communication network to a new communication network, or handed over from the original CN node to a new CN node, the original CN node needs to be found by using the NRI/GUMMEI and the temporary identity of the UE to obtain the context of the UE, for achieving a rapid handover. For a handover between different communication networks, since the communication networks adopt different RATs, when the UE is handed over from the original communication network to a new communication network, the identify of a RAT of the original communication network, that is, the identity of an old RAT, also needs to be mapped to the identify of a RAT of the new communication network for access, so that the CN node in the original communication network can be found, and the UE context can be obtained.

Specifically, a GUTI has the following structure: GUTI=GUMMEI+M-TMSI (MME-TMSI); where GUMMEI=PLMN-id+MMEI, PLMN-id=MCC+MNC; and MMEI=MME Group ID+MMEC; therefore, the following equations can be obtained:

GUTI=MCC+MNC+MME Group ID(16 bit)+ MMEC(8 bit)+M-TMSI(32 bit);

GUMMEI=MCC+MNC+MME Group ID+MMEC;

MMEI=MME Group ID+MMEC;

S-TMSI(40 bit)=MMEC+M-TMSI

When the UE carrying the 2G/3G temporary identity P-TMSI/old Routing Area Identifier (RAI) accesses the SAE system, the 2G/3G temporary identity needs to be mapped to a GUTI, as shown in FIG. 11, that is, the Mobile Country Code (MCC) and the Mobile Network Code (MNC) in the old RAI needs to be mapped to an MCC and an MNC in the GUTI respectively, the Location Area Code (LAC) needs to be mapped to a Mobility Management Entity Group Identity (MMEGI) in the GUTI, the NRI needs to be mapped to a Mobility Management Entity Code (MMEC) in the GUTI, and the Routing Area Code (RAC) and other P-TMSI contents needs to be mapped to an M-TMSI in the GUTI.

In the implementation of the present invention, the inventor finds that the prior art has at least the following problems.

Since the mapped RAT identity is different from the real RAT identity, it is possible that no CN node corresponding to the mapped RAT identity will be found, that is, it is possible that no new CN node can be selected in the new communication network.

In addition, since different communication networks are involved, if the new CN node cannot identify whether the current RAT identity is the real RAT identity or the mapped RAT identity, it cannot be known which form of RAT can be used to obtain the UE context from the original CN node, resulting in that the UE context cannot be obtained.

SUMMARY OF THE INVENTION

The embodiment of the present invention is directed to a method and device for access and obtaining user equipment context and user equipment identity, so as to achieve flexible application of temporary identities.

An embodiment of the present invention provides a method for access, which includes:

when a user equipment (UE) accesses a System Architecture Evolution (SAE) network, judging, by a network node, for example, an eNodeB or a preset central node, whether a Globally Unique Mobility Management Entity Identifier (GUMMEI) carried by the UE or a Mobility Management Entity Group Identity (MMEGI) in the GUMMEI is allocated by the SAE network or mapped;

if the GUMMEI or MMEGI is allocated by the SAE network, selecting, by the eNodeB, a Mobility Management Entity (MME) according to the GUMMEI, or according to the MMEGI and a Mobility Management Entity Code (MMEC), or according to a selected Public Land Mobile Network Identity (PLMN-id), the MMEGI and the MMEC; and if the GUMMEI or MMEGI is mapped, selecting, by the eNodeB, an MME according to a Mobile Country Code (MCC), a Mobile Network Code (MNC) and an MMEC in the GUMMEI, or according to the MMEC in the GUMMEI, or according to a selected PLMN-id and the MMEC in the GUMMEI.

An embodiment of the present invention further provides a method for access, which includes:

when a UE accesses an SAE network, judging, by an MME, whether a Global Unique Temporary Identity (GUTI) carried by the UE is allocated by the SAE network or mapped;

if the GUTI is allocated by the SAE network, obtaining, by the MME, a UE context from an old MME by using the GUTI; and if the GUTI is mapped, reconstructing, by the MME, an old Routing Area Identification (old RAI) and a Packet Temporary Mobile Subscriber Identity (P-TMSI) from the GUTI, and obtaining the UE context from an old Serving General Packet Radio Service (GPRS) Support Node (old SGSN) by using the old RAI and P-TMSI, or reconstructing, by the MME, an old RAI and a Temporary Logical Link Identity (TLLI) from the GUTI, and obtaining the UE context from the old SGSN by using the old RAI and TLLI.

An embodiment of the present invention further provides a method for access, which includes:

when a UE accesses an SAE network, mapping, by an MME, a GUTI carried by the UE to an old RAI and a P-TMSI, or mapping, by the MME, the GUTI carried by the UE to a TLLI and a P-TMSI Signature;

obtaining, by the MME, a UE context from an old MME or an old SGSN by using the mapped old RAI and P-TMSI, or mapped TLLI and P-TMSI Signature; and reconstructing, by the old MME, a GUTI from the old RAI and P-TMSI, or from the old RAI and TLLI and P-TMSI Signature, and returning the UE context to the MME according to the reconstructed GUTI.

An embodiment of the present invention further provides a method for access, which includes:

when a UE accesses an SAE network, if the old node is an MME, obtaining, by the MME, a UE context from an old MME by using a GUTI;

if the old node is a Gn/Gp SGSN, reconstructing, by the MME, an old RAI and a P-TMSI from the GUTI, and obtaining the UE context from the old SGSN by using the old RAI and P-TMSI; or reconstructing, by the MME, a TLLI from the GUTI, and obtaining the UE context from the old SGSN by using the TLLI; and if the old node is an S4 SGSN, obtaining, by the MME, the UE context from the old SGSN by using the GUTI; and reconstructing, by the old SGSN, an old RAI and a P-TMSI from the GUTI, finding the UE context by using the old RAI and P-TMSI, and returning the UE context to the MME, or reconstructing, by the old SGSN, an old RAI/TLLI from the GUTI, finding the UE context by using the old RAI/TLLI, and returning the UE context to the MME.

In an embodiment of the present invention further provides a method for access, which includes:

when a UE accesses a 2G/3G network, finding, by an SGSN, an address of a corresponding old entity according to an old RAI and a P-TMSI carried by the UE, or finding, by the SGSN, an address of a corresponding old entity according to a TLLI carried by the UE, and obtaining a UE context from an old entity; and if the old entity is an old MME, reconstructing, by the old MME, a GUTI from the old RAI and P-TMSI, or reconstructing, by the old MME, a GUTI from the TLLI and a P-TMSI Signature, and finding and returning the UE context to the SGSN.

In an embodiment of the present invention further provides a method for access, which includes:

when a UE accesses a 2G/3G network, determining, by an SGSN, whether a corresponding old entity is an old SGSN or an old MME according to whether an old RAI and a P-TMSI carried by the UE are allocated by the 2G/3G network or mapped, or according to whether a TLLI and a P-TMSI Signature carried by the UE are allocated by the 2G/3G network or mapped;

if the old RAI and P-TMSI carried by the UE are mapped, or the TLLI and P-TMSI Signature carried by the UE are mapped, and the old entity is an old MME, reconstructing, by the SGSN, a GUTI according to the old RAI and P-TMSI, or reconstructing, by the SGSN, a GUTI according to the TLLI/P-TMSI Signature, and obtaining a UE context from the old MME by using the GUTI; and finding, by the old MME, the UE context according to the GUTI and returning the UE context to the SGSN; and if the old RAI and P-TMSI carried by the UE are allocated by the 2G/3G network, or the TLLI and P-TMSI Signature are allocated by the 2G/3G network, and the old entity is an old SGSN, obtaining, by the SGSN, the UE context from the old SGSN by using the old RAI and P-TMSI, or obtaining, by the SGSN, the UE context from the old SGSN by using the TLLI.

An embodiment of the present invention further provides a method for obtaining a UE context, which includes:

when a temporary identity indicated by a Temporary Identity used in Next update (TIN) is consistent with an additional temporary identity, carrying, by a UE, only the temporary identity indicated by the TIN for access; and finding, by an access node, a UE context by using the temporary identity indicated by the TIN carried by the UE.

An embodiment of the present invention further provides a method for obtaining a UE context, which includes:

during Tracking Area Update (TAU) or Routing Area Update (RAU) in a handover process, only carrying, by a UE, a TMSI of a current RAT system or not carrying any TMSI, and finding, by the UE, a UE context through a connection established by a target network.

An embodiment of the present invention further provides a method for obtaining a UE identity, which includes:

in an Attach process initiated by a UE, if the UE has a temporary identity of an RAT, carrying, by the UE, the temporary identity, and finding, by an access entity, a corresponding node according to the temporary identity, and obtaining an International Mobile Subscriber Identity (IMSI) and a security parameter of the UE; and if the UE does not have the temporary identity of the access RAT, but has a temporary identity of another RAT, carrying, by the UE, the temporary identity of the another RAT, and finding, by the access entity, a corresponding node according to the temporary identity of the another RAT, and obtaining an IMSI and a security parameter of the UE.

An embodiment of the present invention further provides a network side device, which includes:

an identity attribute obtaining module, configured to obtain an attribute of a temporary identity of a UE currently accessing a network, wherein the attribute of the temporary identity of the UE is whether the UE identity is allocated by the network side or mapped; and a network resource node allocation module, configured to allocate a network resource node to the UE according to the attribute of the temporary identity of the UE.

An embodiment of the present invention further provides an access method, which includes:

when a UE accesses an SAE network, carrying, by the UE, an SAE Temporary Mobile Subscriber Identity (i.e., S-TMSI, which is formed by an MMEC and an M-TMSI, and if the UE carries a 2G/3G identity and accesses the SAE/LTE system, the S-TMSI is really mapped by an NRI and an RAC and a part of a P-TMSI) in a Radio Resource Control (RRC) Connection Request message sent to an evolved NodeB (eNodeB), where a GUMMEI is not carried in an RRC Connection Setup Complete message sent to the eNodeB; and selecting, by the eNodeB, a corresponding MME according to the received S-TMSI, and if no corresponding MME exists, selecting, by the eNodeB, a new MME.

Through the embodiment of the present invention, it is distinguished whether a temporary identity carried by a UE when accessing a network is allocated by the network or mapped, so as to adopt different access methods for different temporary identities, thereby achieving flexible application of temporary identities.

DETAILED DESCRIPTION OF THE EMBODIMENTS

The present invention is hereinafter described in detail with reference to some exemplary embodiments and the accompanying drawings.

Embodiment 1

This embodiment provides a method for distinguishing an LAC and an MMEGI, for example, the LAC and the MMEGI can be distinguished by setting a bit in the LAC and a corresponding bit in the MMEGI to have different values. In a specific setting method, for example, the first bit of the MMEGI is 1, and the first bit of the LAC is 0, and the bit is referred to as a flag bit for distinguishing the MMEGI and the LAC, and definitely, other bits may also be used as the distinguishing flag bit. In this way, when a UE accesses an eNodeB by using a GUTI mapped from an old RAI and a P-TMSI in a 3G network, or mapped from the old RAI and a TLLI in a 2G communication network, the eNodeB identifies through the distinguishing flag bit or bits whether the UE uses an real temporary identity or a mapped temporary identity for access. For example, the eNodeB identifies whether the UE accesses by using a temporary identity allocated by the SAE network (for example, GUMMEI, S-TMSI or GUTI), or a mapped temporary identity, such as the GUTI mapped from the old RAI and P-TMSI (or old RAI and TLLI) as described above. In a case that the UE carries the mapped GUTI for access, the eNodeB selects an MME corresponding to the MMEC mapped from an NRI, and the MME may not be the MME in which the UE registered. Alternatively, the eNodeB selects the MME supporting Idle mode Signaling Reduction (ISR), or a combined node, or a configured node.

Figure 1:
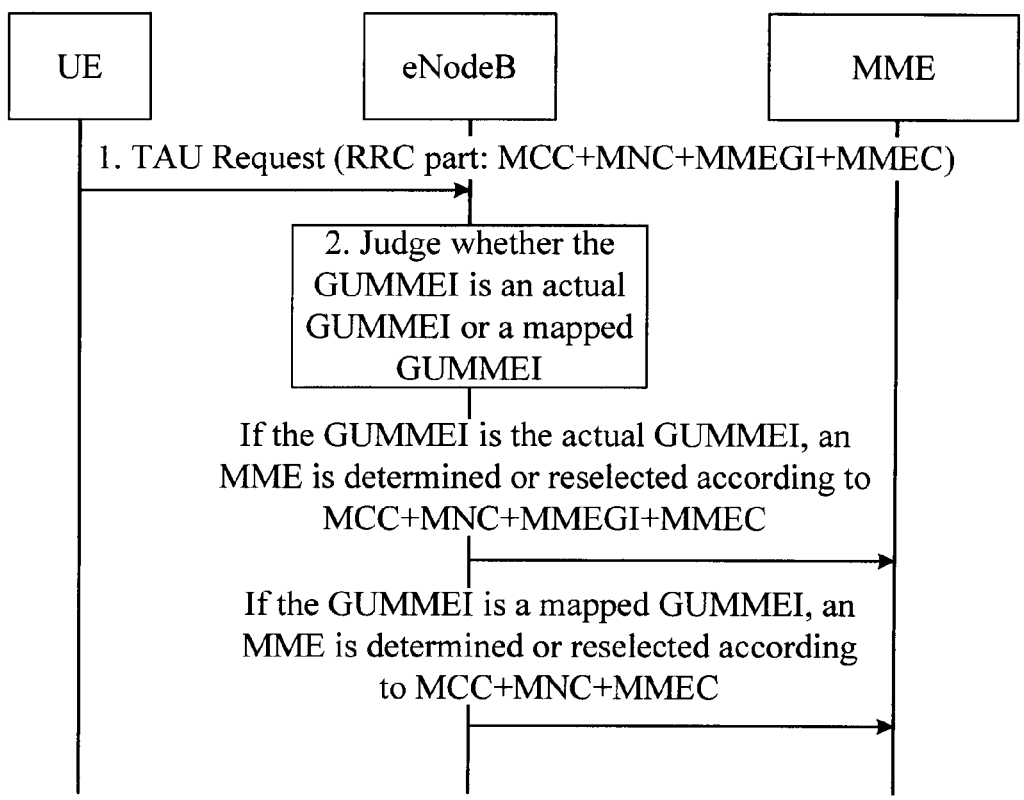
FIG. 1 is a schematic flowchart of an access method according to a first embodiment of the present invention.

Referring to FIG. 1, in the process of accessing the SAE network, the UE carries GUMMEI information in a Radio Resource Control (RRC) part, that is, carries GUMMEI information in the RRC part in a TAU Request message sent by the UE to the eNodeB. The eNodeB checks whether the GUMMEI is a mapped GUMMEI, or a GUMMEI allocated by the SAE network, and if the GUMMEI is a GUMMEI allocated by the SAE network, the eNodeB determines an MME according to all information in the GUMMEI, that is, MCC+MNC+MMEGI+MMEC, or MMEGI+MMEC, or selected PLMN+MMEGI+MMEC. Alternatively, the eNodeB fails to find a corresponding GUMMEI and reselects an MME. If an MME corresponding to MCC+MNC+MMEGI+MMEC or MMEGI+MMEC or selected PLMN+MMEGI+MMEC exists, the eNodeB selects the MME, and the GUMMEI of the MME is consistent with the GUMMEI carried by the UE or correspondingly consistent with MMEGI+MMEC or selected PLMN+MMEGI+MMEC. If no corresponding MME exists, the eNodeB reselects an MME. If the GUMMEI is a mapped GUMMEI, the eNodeB determines an MME according to MCC+MNC+MMEC in the GUMMEI or only according to MMEC or selected PLM+MMEC. Specifically, if the MCC, the MNC, and the MMEC of an MME are consistent with the MCC, MNC, and MMEC (mapped from NRI) carried by the UE or an MME is configured to be selected, for example, if the eNodeB is configured with an MMEC or NRI corresponding to an MME, the MME is selected; otherwise, an MME is reselected.

Alternatively, in the process of accessing the SAE network, the UE identifies, according to the identity to be carried by the UE, an identity to be carried. For example, the UE identifies, by using a Temporary Identity used in Next update (TIN), an identity to be carried. If TIN="P-TMSI", it indicates that an identity mapped from the P-TMSI/old RAI needs to be carried for next access, and if TIN="GUTI", it indicates that an identity in the SAE network needs to be carried for next access, and if TIN="RAT-related TMSI", it indicates that a TMSI allocated by an RAT to be accessed next time is used. Therefore, if the TIN of the UE is equal to "P-TMSI", the UE may not carry the mapped GUMMEI in the RRC part to access the network, but may carry an S-TMSI (formed by an MMEC and an M-TMSI, and really mapped by an NRI and an RAC and a part of a P-TMSI) in the RRC part to access the network, so that the eNodeB does not obtain the MMEGI, and the eNodeB selects an MME according to the MMEC (mapped from NRI) in the S-TMSI. Definitely, if an MOCN exists, the eNodeB may not only select an MME according to the MMEC in the S-TMSI, but also select an MME according to selected PLMN-id information, that is, the eNodeB selects an MME according to the selected PLMN-id and the MMEGI and MMEC. Specifically, if MCC+MNC in a GUMMEI of an MME is identical to the selected PLMN-id carried by the UE, and an MMEC in the GUMMEI of the MME is identical to the MMEC carried by the UE, the network node selects the MME. Moreover, the UE also needs to carry a mapped GUTI in a Non Access Stratum (NAS) part, so as to enable the MME to obtain a context from an old SGSN.

Alternatively, the eNodeB configures an LAC list, and when the eNodeB finds that the MMEGI belongs to the LAC list, the eNodeB selects a corresponding MME. For example, when the eNodeB finds that the GUMMEI carried by the UE is consistent with an identity of a corresponding MME configured on the eNodeB, the corresponding MME is selected; otherwise, if no corresponding MME exists, a new MME is selected. The GUMMEI of the MME is really mapped from PLMN-id+LAC+NRI. For example, a Pool of an SAE network overlaps a Pool of a 2G/3G network, and an MME/SGSN combined node exists in the Pool, and three Routing Areas (RAs), namely, RAI1, RAI2, and RAI3, exist in the Pool of the 2G/3G network. When the UE moves from the 2G/3G network to the SAE network and accesses the SAE network, the UE uses the GUTI mapped from the old RAI/P-TMSI for access, and the eNodeB finds, according to configured information, that the UE uses the mapped GUTI, and an RA before mapping belongs to one of the RAI1, RAI2, and RAI3. At this time, the eNodeB selects a corresponding MME according to MCC+MNC+MMEC (mapped from NRI) or MMEC or selected PLMN+MMEC, even if the MCC, MNC, MMEGI, and MMEC are not all consistent. If no corresponding MME satisfying the above conditions exists, for example, no MME belongs to the configured RAIs, an MME is reselected.

The eNodeB may configure the LAC list by using the following method.

The MME maps a configured LAC to a GUMMEI and sends the GUMMEI to the eNodeB through an S1 SETUP RESPONSE message or MME CONFIGURATION UPDATE message, and the eNodeB records the S1 SETUP RESPONSE message or the MME CONFIGURATION UPDATE message, and stores the message in configuration information, that is, in the LAC list. An example will be given below for illustration.

Figure 8:
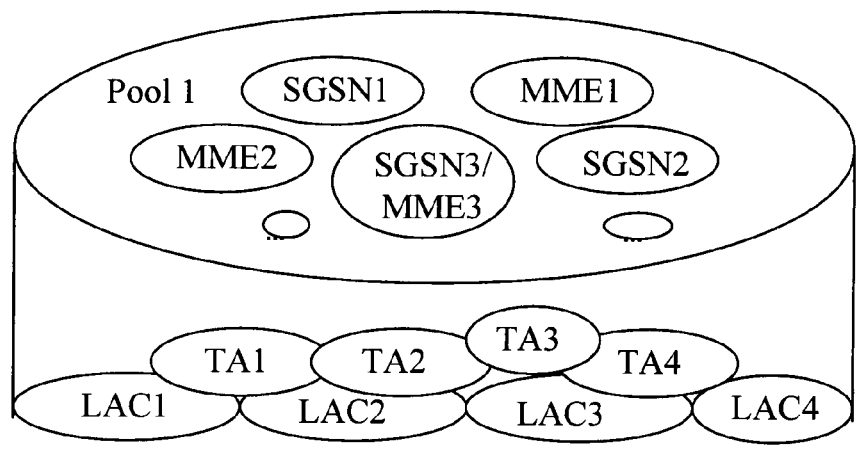
FIG. 8 is a schematic view of a network scenario according to the first embodiment of the present invention.

For example, in FIG. 8, Pool1 includes an SGSN Pool and an MME Pool, SGSN1, SGSN2, MME1, and MME2 are nodes in the Pool1, and an MME/SGSN combined node SGSN3/MME3 also exists in the Pool1. In FIG. 8, LAC1, LAC2, LAC3 and LAC4 are respectively location area codes in the 2G/3G network, and TA1, TA2, TA3 and TA4 are respectively tracking areas of the SAE network. From the view of the SAE system, a GUMMEI of the combined node SGSN3/MME3 is PLMN-id (PLMN Identity, PLMN-id=MCC+MNC)+MMEGI (that is, id of the MME Pool)+MMEC (that is, id of the MME3 in the MME Pool). In order to enable the UE registering to the combined node, the SGSN3, to select the combined node when entering the SAE area from the 2G/3G area, the MME3 may configure all LACs in the SGSN3 Pool into the eNodeB so as to form an LAC list, and the method is as follows.

For each LAC in the Pool1, the MME3 respectively forms a GUMMEI, and the GUMMEI is corresponding to PLMN-id+LAC+NRI (i.e., an NRI configured by a combined node to the SGSN, that is, the SGSN3, generally equal to an MMEC configured by the combined node to the MME). Therefore, the MME3 may form several GUMMEIs. The MME3 sends a list of an real GUMMEI (an identity in the SAE network) and mapped GUMMEIs (each LAC in the Pool1 is corresponding to one GUMMEI) to the eNodeB through the S1 SETUP RESPONSE message or MME CONFIGURATION UPDATE message, and the eNodeB stores the GUMMEI list (or the LAC list, since each LAC has a corresponding GUMMEI), so that when the UE registering to the SGSN3 enters an E-UTRAN area from an LAC, such as LAC1 or LAC2, in Pool1, and accesses the eNodeB, since the identity carried by the UE for access is the GUMMEI (mapped from PLMN-id+LAC1+NRI), the eNodeB can know, by querying the configuration, that is, by querying the previously stored list of real GUMMEI and mapped GUMMEIs, that the GUMMEI is corresponding to the MME3real, and then directly select the MME3.

The above configuration method is disadvantageous in that, due to the combined node and ISR requirements, one MME may have a large number of mapped GUMMEIs, and since the MME forms a corresponding MMEGI for each LAC in the Pool, and even the MME respectively configures an MMEGI for each LAC in the neighboring SGSN Pool so as to meet the ISR requirements, the S1 SETUP RESPONSE message or MME CONFIGURATION UPDATE message may need to carry a large number of GUMMEIs.

Currently, the S1 SETUP RESPONSE message and MME CONFIGURATION UPDATE message carry the GUMMEI list through the following method, as shown in Table 1, where other information elements (IEs) are omitted for convenience of description.

TABLE 1

| IE/Group Name (information element name) | ... |
|---|---|
| Served GUMMEIs (list of served GUMMEIs) | ... |
| >GUMMEI (GUMMEI value) | ... |

As shown in Table 1, the S1 SETUP RESPONSE message or MME CONFIGURATION UPDATE message carries a complete GUMMEI list, that is, a list of the served GUMMEIs. In addition, when the SGSN Pool adds/deletes/modifies an LAC, the MME resends all the GUMMEI lists to each eNodeB through an MME CONFIGURATION UPDATE message. Since the GUMMEI list is large, and a large number of eNodeBs are involved, it inevitably leads to transmission of a large amount of information in the network, which increases the signaling traffic in the network, that is, increases the network overhead. For example, if a Pool has 10 MMEs and 200 eNodeBs, when a related LAC is changed, each MME needs to send an MME CONFIGURATION UPDATE message to each eNodeB, which means that 2000 CONFIGURATION UPDATE messages will be transmitted over the S1 interface, and each message contains all the GUMMEI lists (both updated and non-updated ones need to be sent). In order to avoid this situation, the embodiment of the present invention may also adopt the following method.

(1) In order to reduce the size of the configuration message such as the S1 SETUP RESPONSE message or MME CONFIGURATION UPDATE message, and realize that the configuration message such as the S1 SETUP RESPONSE message or MME CONFIGURATION UPDATE message does not need to carry a large number of GUMMEI lists, the GUMMEI may be decomposed, and then lists respectively formed by the components of the GUMMEI are sent, that is, an LAC list configuration message sent by the MME to the eNodeB carries a PLMN-id list, an MMEGI list, and an MMEC list, which is specifically described as follows.

Since the MME forms a corresponding GUMMEI for each LAC in the Pool, really configuration of an LAC list by the eNodeB may also be construed as configuration of a GUMMEI list on the eNodeB. Since the GUMMEI is formed by PLMN-id+MMEGI+MMEC, if a GUMMEI is formed by a mapping method, an real value of the GUMMEI is PLMN-id+LAC+NRI. Generally speaking, the MMEC and NRI have the same values, and the PLMN-id also has the same value, so that the GUMMEI list contains a lot of identical contents. Therefore, as shown in Table 2, the GUMMEI list can be modified into a form of PLMN-id (that is, PLMN Identity in the table)/PLMN-id list+MMEGI list+MMEC/MMEC list, where PLMN-id list refers to a list of the PLMN-ids, MMEGI list refers to a list of the MMEGs, and MMEC list refers to a list of the MMECs.

TABLE 2

| IE/Group Name (information element name) | |
|---|---|
| Served PLMN (list of served PLMNs) | ... |
| >PLMN Identity (PLMN value) | ... |
| Served GUMMGIs (list of served GUMMGIs, briefly referred to as GUMMGI list herein) | ... |
| >MMEGI (MMEGI value) | ... |
| Served MMEC/MMEC list (list of served MMECs or served MMECs, briefly referred to as MMEC list or MMEC list) | ... |

Generally, the PLMN-id and MMEC in the GUMMEI list have the same values, and only the MMEGI has different values, so the sending of a large amount of repetitive PLMN-id and MMEC can be saved by modifying the GUMMEI list into the form of PLMN-id+MMEGI list+MMEC. Definitely, in a case that multiple PLMNs are supported, the PLMN-id may also be modified into a PLMN-id list, and similarly, the MMEC may also be modified into an MMEC list. The eNodeB receives and stores the modified list, and combines the information such as PLMN-id, MMEGI list and MMEC in the table into a GUMMEI list, thereby completing the configuration of an LAC list.

For example, currently, the PLMN-id occupies 3 bytes, the MMEGI occupies 2 bytes, and the MMEC occupies 1 byte. If an MME Pool supports 3 PLMNs, the MME Pool needs to configure 100 MMEGIs and one MMEC, where the 100 MMEGIs include 1 real MMEGI and 99 MMEGIs mapped from the LAC. If the current configuration method is adopted, the size of the GUMMEI list is: 3*100*(3+2+1)=1800 bytes. If the method in the embodiment of present invention is adopted, the GUMMEI list is formed by the PLMN-id list, the MMEGI list and the MMEC list, and occupies 3*3 (PLMN-list)+100*2 (MMEGI list)+1*1 (MMEC list)=210 bytes. It can be seen that, the space occupied by the GUMMEI list is greatly reduced.

(2) In order to solve the problem that when an LAC or GUMMEI is changed, the MME needs to send all the GUMMEI lists to the eNodeB, which leads to transmission of a large amount of information in the network, the embodiment of the present invention proposes that, when an LAC or GUMMEI is changed, the MME sends an indication message to the eNodeB, which indicates the eNodeB to add/modify/delete the GUMMEI in the LAC list, for example, the MME carries an indication in an MME CONFIGURATION UPDATE message sent to the eNodeB, and specifies the change of the LAC or GUMMEI in the indication, that is, whether one GUMMEI or a plurality of GUMMEIs is added, or a GUMMEI is modified, or a GUMMEI is deleted. The modified MME CONFIGURATION UPDATE message is as shown in Table 3.

TABLE 3

| IE/Group Name (information element name) | Presence (Mandatory/ Optional) | Range (range) | IE type and reference (reference value) |
|---|---|---|---|
| Message Type (message type) | M (Mandatory) | | |
| MME Name (MME name) | O (Optional) | | OCTET STRING |
| Served PLMNs (list of served PLMNs, briefly referred to as PLMN list) | | 0..<maxnoofPLMNsPerMME> (0 to the maximum number of PLMNs supported by each MME) | |
| >PLMN Identity (PLMN value) | M (Mandatory) | | |
| Served GUMMEIs (list of served GUMMEIs, briefly referred to as GUMMEI list) | | 0..<maxnoofGUMMEIs> (0 to the maximum number of GUMMEIs supported by each MME) | |
| >original GUMMEI (original GUMMEI value) | O (Optional) | | |
| >new GUMMEI (new GUMMEI value) | O (Optional) | | |
| >behavior (behavior) | O (Optional) | <add, modify, delete> (add, modify, delete) | |
| Relative MME Capacity (relative MME capacity) | O (Optional) | | |

Definitely, it may also be directly indicated in the message whether to add/modify/delete a GUMMEI, and the MME does not need to send other unchanged GUMMEIs to the eNodeB, which may be, for example, implemented as follows.

When the MME needs to add a GUMMEI, the MME sends an MME CONFIGURATION UPDATE (new GUMMEI, behavior='add') message to the eNodeB, where "new GUMMEI" indicates an identity (ID) of a GUMMEI to be added, "behavior='add'" indicates that a GUMMEI needs to be added to the original LAC list, and "behavior" is an information element (IE), whose value represents a specific behavior. In this way, after receiving the MME CONFIGURATION UPDATE (new GUMMEI, behavior='add') message, the eNodeB adds a GUMMEI to the original LAC list.

When the MME needs to delete a GUMMEI, the MME sends an MME CONFIGURATION UPDATE (GUMMEI, behavior='delete') message to the eNodeB, where "GUMMEI" indicates an ID of a GUMMEI to be deleted from the original LAC list, and "behavior='delete'" indicates that a GUMMEI needs to be deleted. After receiving the message, the eNodeB deletes a corresponding GUMMEI from the original LAC list according to the message.

When the MME needs to modify a GUMMEI, the MME sends an MME CONFIGURATION UPDATE (new GUMMEI, GUMMEI, behavior='modify') message to the eNodeB, where "behavior='modify'" indicates that a GUMMEI in the original LAC list needs to be modified, "GUMMEI" indicates an ID of a GUMMEI to be modified, and "new GUMMEI" indicates an ID of a GUMMEI to be changed to after modification, that is, the ID of the GUMMEI corresponding to "GUMMEI" in the original LAC list needs to be modified into "new GUMMEI".

Definitely, the IE "behavior" may not be carried, for example, "updated GUMMEI" and "new GUMMEI" may be used to indicate the behavior, where "updated GUMMEI" indicates that an original GUMMEI needs to be updated, and new GUMMEI indicates that a new GUMMEI needs to be added. In this way, if updated GUMMEI has no value or is not carried, and new GUMMEI=5, it indicates that a GUMMEI having an ID of 5 needs to be added; if updated GUMMEI=5, and new GUMMEI has no value or is not carried, it indicates that a GUMMEI having an ID of 5 needs to be deleted; and if updated GUMMEI=5, and new GUMMEI=10, it indicates that the ID of a GUMMEI having an ID of 5 needs to be modified into 10.

(3) Definitely, in order to further reduce the number of messages sent to the eNodeB when an LAC or GUMMEI is changed, and reduce the signaling traffic between the MME and the eNodeB, another method may also be adopted, which is described as follows.

All configuration information is collected in a preset central node. The central node may be a preset eNodeB, or a preset MME. The central node has configuration information of all MMEs, and if configuration information of an MME is changed, the central node sends a configuration message, for example, sends an S1 SETUP RESPONSE message or MME CONFIGURATION UPDATE message, to all eNodeBs. Therefore, when the central node needs to send configuration information to the eNodeB, the configuration information of all MMEs is sent. For example, a GUMMEI list in the S1 SETUP RESPONSE message or MME CONFIGURATION UPDATE message is not a GUMMEI list of one MME, but is a GUMMEI list of all MMEs. Definitely, in order to implement the method, the S1 SETUP RESPONSE message needs to be modified, and the modified S1 SETUP RESPONSE message is as shown in Table 4.

TABLE 4

| IE/Group Name (information element name) | Presence (Mandatory/ Optional) | Range (range) |
|---|---|---|
| Message Type (message type) | M (Mandatory) | |
| GUMMEI (list of MMEIs, GUMMEI being taken as an index) | | 1..<maxnoofMMEper MME Pool> (1 to the maximum number of MMEs in each Pool) |
| > MME Name (MME name) | M (Mandatory) | |
| > Mapped GUMMEI list (list of GUMMEIs) | | |
| > Relative MME Capacity (relative MME capacity) | M (Mandatory) | |
| Criticality Diagnostics (diagnosis) | O (Optional) | |

In the table, "GUMMEI" is an real GUMMEI of each MME, and each MME has only one real GUMMEI. Here, the mapped GUMMEI is not considered. Each MME uses the real GUMMEI as a unique identity. Information of all MMEs is collected to form an MME list. Each MME in the MME list has specific configuration information, for example, MME name, capacity, and mapped GUMMEI list. Here, GUMMEI list may be a (PLMN-id+MMEGI+MMEC) list, or PLMN-id list+MMEGI list+MMEC list, and the mapped GUMMEI list may not exist.

To sum up, the central node provides configuration information of all MMEs in the MME Pool to the eNodeBs in the Pool through a configuration message, so that when an LAC or GUMMEI is changed, the central node only needs to send an MME CONFIGURATION UPDATE message to each eNodeB, without requiring each MME to send a message to each eNodeB, thereby reducing the number of messages transmitted in the network. For example, if an MME Pool has 10 MMEs and 200 eNodeBs, when an LAC is changed, the central node only needs to send a configuration message regarding changed configuration to the 200 eNodeBs, and the number of messages is only 200. Definitely, before this, the MME may also need to send a configuration message of the MME to the central node.

The three methods (1), (2), and (3) may be used separately, or used in combination. Definitely, the combination can achieve a better effect, for example, if the method (1) and the method (2) are used in combination, when 10 LACs are added, the MME only needs to update information of the 10 LACs, and then sends PLMN-id list+10 MMEGIs mapped from LACs+MMEC to the eNodeB, and in a case that CN nodes of multiple operators are not supported, the size of the message sent to the eNodeB is only 3+20+1=24 byte. Otherwise, if only the method (1) is used, although the message size is reduced, the number of messages is not changed, that is, all GUMMEI information (including non-updated information) needs to be sent to the eNodeB; while if only the method (2) is used, although the number of messages is reduced, the message size is still 6*10=60 bytes, which is apparently much larger than the message size achieved by using the method (1) and the method (2) in combination, that is, "24 bytes". Definitely, the method (3) may also be used in combination with the method (1) and/or the method (2), which will not be described in detail herein.

It should be noted that, although this embodiment is illustrated by taking the use of an eNodeB as the network node as an example, the network node may also be the central node, that is to say, the operation performed by the eNodeB in this embodiment may also be accomplished by the central node, for example, the central node may also serve as a node for selecting a CN node, that is, the central node is connected to each eNodeB, and when the UE accesses the eNodeB, the eNodeB does not select a CN node, but sends a message to the central node, and the central node selects a CN node, for example, an MME. In this way, it only needs to configure the configuration information of the MME to the central node, without sending the configuration information to the eNodeB, that is to say, each MME only needs to exchange information with the central node when S1 setup or configuration information is changed, that is, when an LAC or GUMMEI is changed. For example, if the MME pool has 10 MMEs and 200 eNodeBs, when an LAC is changed, 10 MMEs only need to send a configuration message regarding changed configuration to the central node, the number of messages is only 10, and it does not need to send the configuration message regarding changed configuration to the 200 eNodeBs, thereby greatly reducing the number of messages transmitted in the network.

The first embodiment has the following beneficial effect: In the first embodiment, by distinguishing the identity of the UE when accessing the network, obtain information of the UE identity, and determine whether the information is allocated by the network or mapped by the network, and select a suitable network node for the UE according to the determination result, thereby preventing the failure of the UE accessing a corresponding CN node due to the changed RAT.

Embodiment 2

In the methods described in the first embodiment, access is performed according to a case that a cell on which the UE currently resides is not located in a registered Tracking Area (TA) when the UE carries the 2G/3G identity to access the SAE/LTE network. In the methods described in the first embodiment, if the cell on which the UE currently resides is located in a registered TA, an NAS part of an RRC Connection Setup Complete message, for example, an NAS part of a TAU Request message (the NAS part of the RRC Connection Setup Complete message is referred to as an NAS message) may not carry the UE identity (UE-id), such as GUTI or P-TMSI or IMSI, that is, the UE may determine whether to carry the UE identity in the NAS message according to whether the currently accessed TA belongs to a TA list of the UE.

That is to say, if the NAS message carries the UE identity, it is generally considered that the cell on which the UE currently resides is not located in a registered TA; however, in fact, if the NAS message carries the UE identity, access may also be performed according to the case that the cell on which the UE currently resides is located in a registered TA. For example, when the UE carries the identity of the 2G/3G network to access the SAE/LTE network, the NAS message can only be an Attach Request message or a TAU Request message. At this time, as long as the two messages always carry the UE identity, even if the selected MME does not have the UE context, the selected MME may also find the old node by using the UE identity and obtain the UE context, or obtain the UE context from a Home Subscriber Server (HSS). Therefore, this embodiment provides another access method.

For convenience of description, the case that the cell on which the UE currently camps is not located in a registered TA is referred to as "TA Not Registered Case" below, and the case that the cell on which the UE currently camps is located in a registered TA is referred to as "TA Registered Case". It should be noted that, to better describe the technical solution provided by this embodiment, the "TA Registered Case" and "TA Not Registered Case" technologies are briefly introduced below, and "TA Registered Case" and "TA Not Registered Case" are technologies when the UE carries an identity allocated by the SAE network to access the SAE network.

Figure 9:
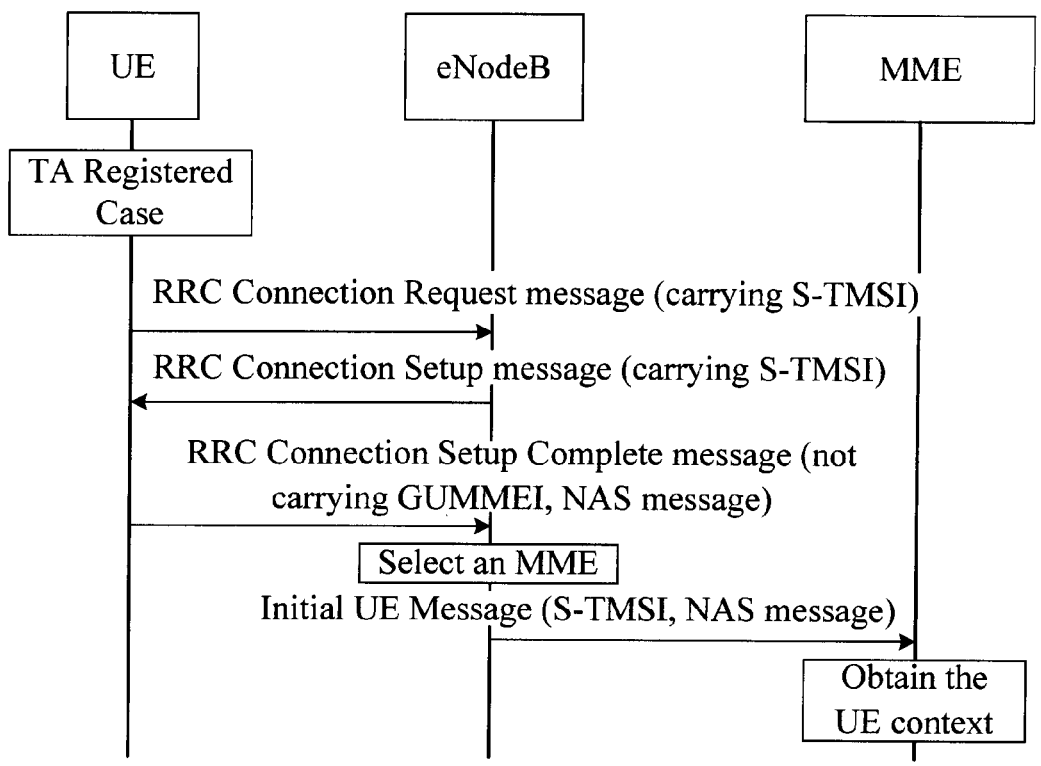
FIG. 9 is a flowchart of a method for accessing an SAE/LTE network by a UE by using TA Registered Case according to the second embodiment of the present invention.
Figure 10:
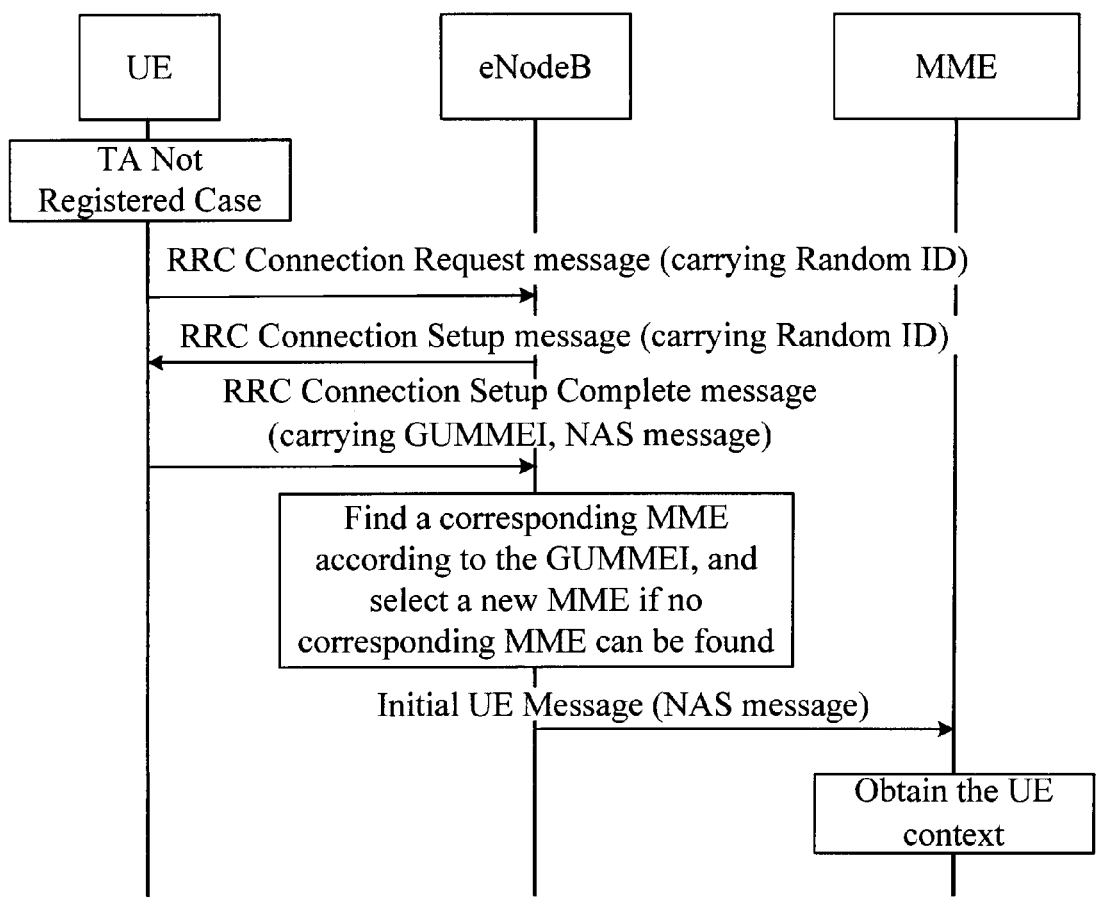
FIG. 10 is a flowchart of a method for accessing an SAE/LTE network by a UE by using TA Not Registered Case according to the second embodiment of the present invention.
Figure 11:
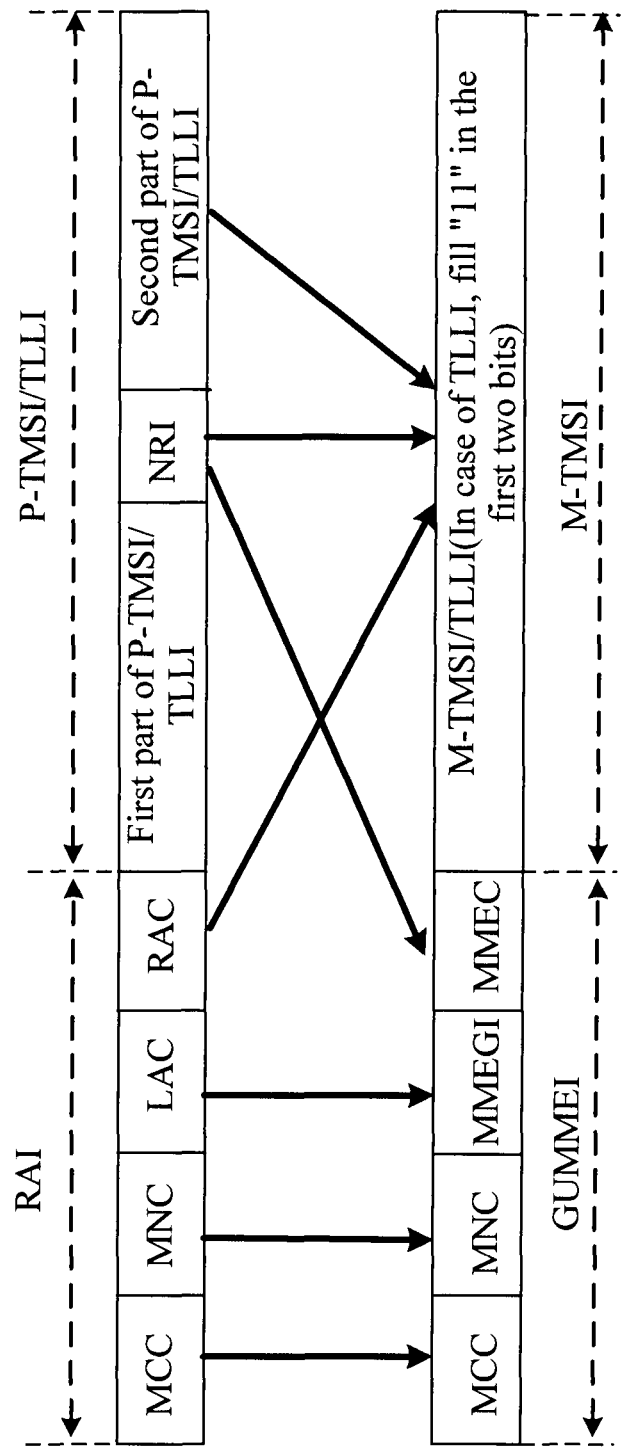
FIG. 11 is a schematic view of mapping a 2G/3G temporary identity to a GUTI.

When the UE enters an SAE Pool and uses a temporary identity allocated by the SAE to initiate an access, the UE judges whether a currently accessed cell is located in a registered area of the UE, that is, the UE detects whether the cell on which the UE currently resides is located in a registered TA. If the cell on which the UE currently resides is located in a registered TA, the UE in an idle mode initiates an RRC Connection Request message carrying an S-TMSI to access the SAE/LTE network. Since in this case, the UE does not move out of the original Pool area, the eNodeB may directly select the original MME according to the MMEC in the S-TMSI (if an MOCN exists, MME selection needs to be performed according to selected PLMN-id information carried by the UE in addition). After an RRC Connection Setup message carrying the S-TMSI returned by the eNodeB is received, in order to reduce the message size and save the occupied bandwidth, an NAS message in an RRC Connection Setup Complete message sent by the UE to the eNodeB may not carry the UE identity, and an RRC part of the RRC Connection Setup Complete message may also not carry the GUMMEI. After the eNodeB selects an MME, the eNodeB sends an Initial UE Message to the selected MME, and then the MME obtains the UE context according to the S-TMSI. The Initial UE Message includes information such as the S-TMSI in the RRC Connection Request initiated by the UE and the NAS message in the RRC Connection Setup Complete message. If the UE detects that the cell on which the UE currently resides is not located in a registered TA, and the UE in the idle mode initiates an RRC Connection Request message carrying a Random ID to access the SAE/LTE network, and then receives an RRC Connection Setup message carrying a Random ID returned by the eNodeB. Since in this case, the UE may move out of or may not move out of the original Pool area, the UE needs to carry a UE identity in an NAS message in an RRC Connection Setup Complete message sent to the eNodeB, and at the same time carry a GUMMEI in an RRC part in the RRC Connection Setup Complete message, so that the eNodeB may find a corresponding MME by using the GUMMEI (if an MOCN exists, the eNodeB selects an MME according to the selected PLMN-id carried by the UE and the MME Group ID and MMEC in the GUMMEI carried by the UE). If a corresponding MME (the original MME) exists, the original MME is directly selected, and if no corresponding MME exists, which indicates that the UE has changed a Pool, the eNodeB selects a new MME, and then sends an Initial UE Message to the selected MME, and the selected MME obtains the UE context. The Initial UE Message contains information such as the NAS message. Reference may be made to FIGS. 9 and 10, where FIG. 9 is a flowchart of a method for accessing an SAE/LTE network by a UE using TA Registered Case, and FIG. 10 is a flowchart of a method for accessing an SAE/LTE network by a UE using TA Not Registered Case.

The access method provided in this embodiment is: When the UE carries a 2G/3G identity to access an SAE system, the UE firstly maps the 2G/3G identity to an SAE identity format, and then accesses according to the TA Registered Case, that is, the UE carries a mapped S-TMSI in an initiated RRC Connection Request message, and does not carry a GUMMEI in the RRC part in the RRC Connection Setup Complete message. The NAS message in the RRC Connection Setup Complete message may always carry the UE identity, and at this time, the eNodeB may not carry an S-TMSI in an Initial UE Message (the first Initial UE Message) sent to the MME. Alternatively, the UE judges whether the currently accessed cell is located in a registered TA, and if the currently accessed cell is located in a registered TA, the NAS message in the RRC Connection Setup Complete message does not carry the UE identity, and if the currently accessed cell is not located in a registered TA, the NAS message in the RRC Connection Setup Complete message carries the UE identity.

Definitely, before the UE accesses the SAE network, the UE may also judge whether the UE identity used for access is allocated by the SAE network or mapped, and if the UE identity is mapped, the operations described in the method are performed, that is, the mapped S-TMSI is carried in the RRC Connection Request message sent by the UE to the eNodeB, and the GUMMEI is not carried in the RRC Connection Setup Complete message sent to the eNodeB; otherwise, if the UE identity is allocated by the SAE network, it is judged whether the area accessed by the UE belongs to the registered area of the UE. If the area accessed by the UE belongs to the registered area of the UE, the access of the TA Registered Case is performed, and if the area accessed by the UE does not belong to the registered area of the UE, the access of the TA Not Registered Case is performed. Reference may be made to the relevant description of "TA Registered Case" and "TA Not Registered Case" in this embodiment, so the details will not be described herein again.

It should be noted that, since the eNodeB needs to distinguish whether the RRC Connection Request message carries the S-TMSI or the Random ID, it needs to define an identity in the S-TMSI and the Random ID, for example, the identity is named as a Distinguishing Mark, having a size of 8 bits, and if digits on the 8 bits are all 1s, it is determined that the RRC Connection Request message carries the Random ID, and if the digits on the 8 bits are not all 1s, it is determined that the RRC Connection Request message carries the S-TMSI. The Distinguishing Mark is located at the MMEC part of the S-TMSI and the first 8 bits of the Random ID.

Since when the UE carries the mapped identity to access the SAE network, the MMEC part of the S-TMSI is mapped from the NRI which may be all 1s, and the eNodeB may make a false determination that the Random ID is received; therefore, the NRI need to be defined to be not all 1s.

Definitely, the UE may not need to judge whether the currently accessed cell belongs to the registered area of the UE, or not need to judge whether the UE identity carried by the UE is allocated by the SAE network or mapped, but always use the TA Registered Case, that is, the S-TMSI is always carried in the RRC Connection Request message sent to the eNodeB, and then the UE identity is always carried in the NAS message in the RRC Connection Setup Complete message for any case, and the S-TMSI carried in the RRC Connection Request is merely used for the eNodeB to select an MME, and does not need to be carried on the S1 interface, that is, the Initial UE Message sent by the eNodeB to the MME does not carry S-TMSI information, thereby reducing the message traffic, and saving the occupied bandwidth. However, the deficiencies of this method lie in that, when the UE changes the Pool, if the new Pool also has an MMEC with the same serial number, the eNodeB directly selects an MME corresponding to the MMEC with the same serial number from the new Pool, rather than select a new MME based on principles such as load balancing. Alternatively, the "TA Not Registered Case" may also be always used for accessing the SAE/LTE network, that is, the UE always carries the Random ID in the RRC Connection Request message sent to the eNodeB, and carries the GUMMEI in the RRC part of the subsequent RRC Connection Setup Complete message, and carries the UE identity in the NAS message of the RRC Connection Setup Complete message, but in this case, the process of initiating a Service Request by the UE is not so quick, because the length of the Service Request is generally limited, so as to initiate the access as quickly as possible.

It should be noted that, the above illustration is given by taking the use of an eNodeB as the RAN node and an MME as a CN node, the RAN node may also be other devices having similar functions to the eNodeB, and the CN node may also be other devices having similar functions to the MME.

The second embodiment has the following beneficial effect: In the second embodiment, the S-TMSI is carried in the RRC Connection Request message initiated by the UE, and then a suitable CN node is selected for the UE according to the S-TMSI, thereby preventing the failure of the UE accessing a corresponding CN node due to the changed RAT; meanwhile, in this embodiment, the RRC Connection Setup Complete message does not carry the GUMMEI, thereby reducing the message traffic, and saving the occupied bandwidth.

Embodiment 3

In this embodiment, an LAC and an MMEGI are distinguished by setting, for example, the LAC and the MMEGI can be distinguished by setting a bit in the LAC and a corresponding bit in the MMEGI to have different values. This embodiment illustrates that, when the UE accesses an MME by using the GUTI, a specific access method may include attach or TAU. If the MME has the UE context, the MME finds the UE by using the GUTI; if the MME has no UE context, the MME finds an old MME by using the GUMMEI in the GUTI, for example, finds the old MME by using a Domain Name System (DNS), and sends a Context Request containing the GUTI or an Identification Request containing the GUTI to the old MME, and the old MME finds the UE Context by using the GUTI, and returns the UE context or IMSI information of the UE to the MME. When the UE accesses the MME by using a GUTI mapped from the old RAI/P-TMSI or TLLI, the MME or DNS needs to distinguish whether the GUTI is allocated by the network, for example, by an SAE network, or mapped. If it is determined that the GUTI is a mapped GUTI, the old RAI/P-TMSI or TLLI/old RAI of the 2G network is reconstructed from the GUTI (if the old SGSN is a 2G SGSN). An old SGSN is found by using the old RAI or using the old RAI and NRI, and a Context Request containing the old RAI, P-TMSI or TLLI, or an Identification Request containing the old RAI, P-TMSI or TLLI is sent to the old SGSN. The old SGSN finds the UE context by using the old RAI and P-TMSI or using the TLLI, and returns the UE context or IMSI information of the UE to the MME.

Figure 2:
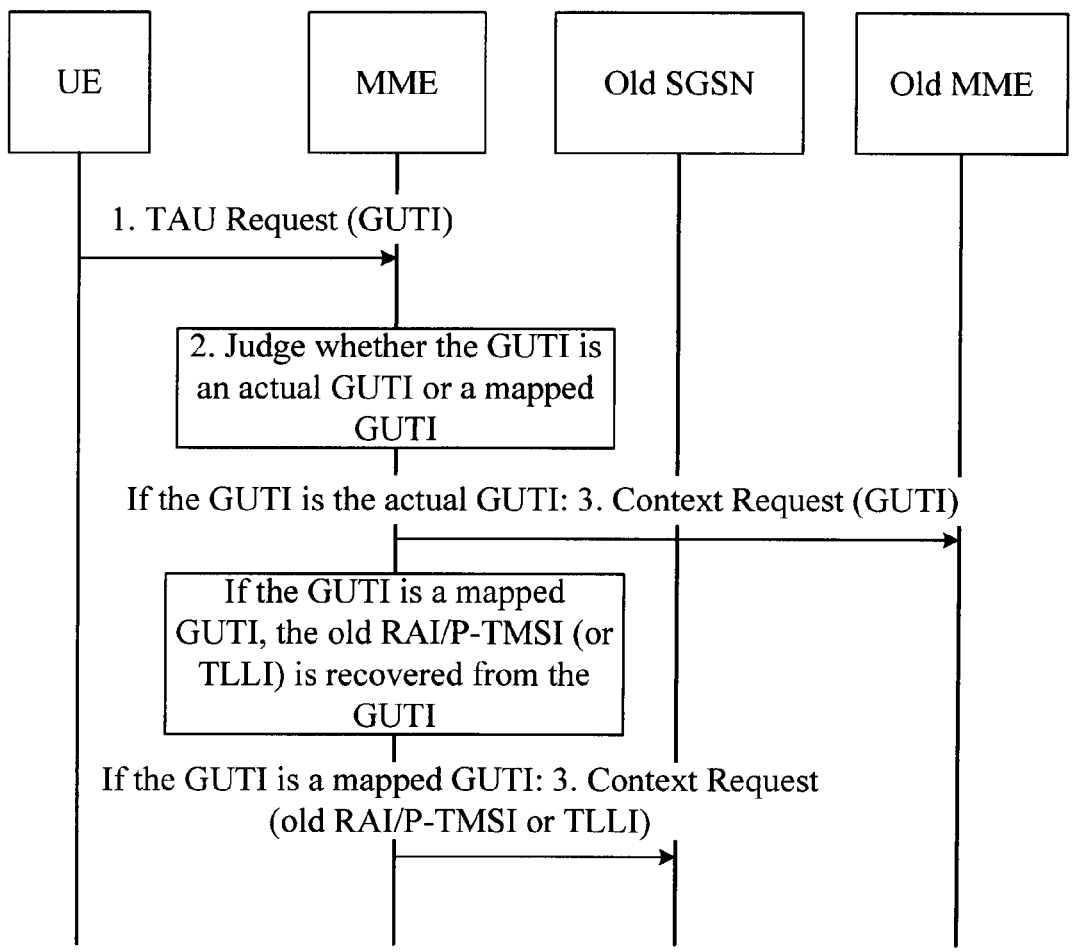
FIG. 2 is a schematic flowchart of an access method according to a third embodiment of the present invention.

Referring to FIG. 2, the UE sends a TAU Request message containing the GUTI to the MME, and the MME checks whether the GUTI is an real GUTI, that is, real GUTI allocated by the SAE network to the UE, or a mapped GUTI. If the GUTI is the real GUTI, the MME sends a Context Request (GUTI, complete TAU Request message) to the old MME to obtain the context from the old MME, and the old MME finds the UE context by using the GUTI. The complete TAU Request message is a TAU Request message sent by the UE, and if the message has integrity protection, the message is sent to the old MME, for the old MME to check integrity protection, and if the validation is successful, the UE context is returned to a new MME. If the MME checks that the GUTI is a mapped GUTI, the MME sends a Context Request (old RAI, P-TMSI or TLLI) to the old SGSN, and the old SGSN finds the UE context according to the old RAI and P-TMSI or according to TLLI.

As for security and integrity protection, when the UE accesses the SAE system by using the mapped GUTI, the following methods may be adopted.

1. Since the old SGSN does not have an integrity protection parameter of the SAE system, the MME may, according to that the GUTI is a mapped GUTI, not send the TAU Request message to the old SGSN. Or 2. No matter whether the GUTI is a mapped identity, the MME always sends the TAU Request message to the old node, for example, the old SGSN, to request for validation, but the old SGSN does not validate the message, and returns information indicating that the validation fails or no validation is performed to the MME, so that the MME performs a security-related process. If the MME does not have the UE context, for example, the Additional GUTI indicates other MMEs, the other MMEs may perform a security-related process, or the MME finds the UE context stored therein according to the Additional GUTI, and performs security validation on the UE, or the MME initiates a security validation process to the UE. Or 3. If the Additional GUTI carried by the UE indicates that the UE context is in the accessed MME, the accessed MME performs security validation on the UE, and if the security validation is successful, the Context Request or Identification Request sent to the old SGSN carries information indicating that the UE is already validated. Or 4. If the Additional GUTI indicates other MMEs, the new MME obtains a security context from the MME indicated by the Additional GUTI, and the new MME performs security validation on the UE according to the obtained security context; or the new MME sends an Attach Request message or TAU Request message to the MME indicated by the Additional GUTI for validation. Or 5. If the UE carries the mapped GUTI for access, the UE does not perform integrity protection on messages such as the TAU Request message or Attach Request message. Or 6. If the UE carries the mapped GUTI for access, the UE carries a P-TMSI Signature field allocated by the SGSN, and sends the P-TMSI Signature field to the network, and the MME receives P-TMSI Signature field and then sends the P-TMSI Signature field to the old SGSN so as to validate the UE. That is to say, if the UE carries the GUTI mapped from the old RAI/P-TMSI or the GUTI mapped from TLLI to access the SAE system, the UE carries the P-TMSI Signature IE, and the MME also carries the P-TMSI Signature IE in the Context Request message sent to the old SGSN, so as to request the old SGSN to validate the UE.

The above security problem may also be applied to the following embodiment that the UE carries a mapped GUTI and accesses an SAE system or the UE carries a mapped old RAI/P-TMSI (or TLLI)/P-TMSI Signature and accesses a 2G/3G network (the positions of the MME and SGSN needs to be interchanged).

Embodiment 4

Figure 3:
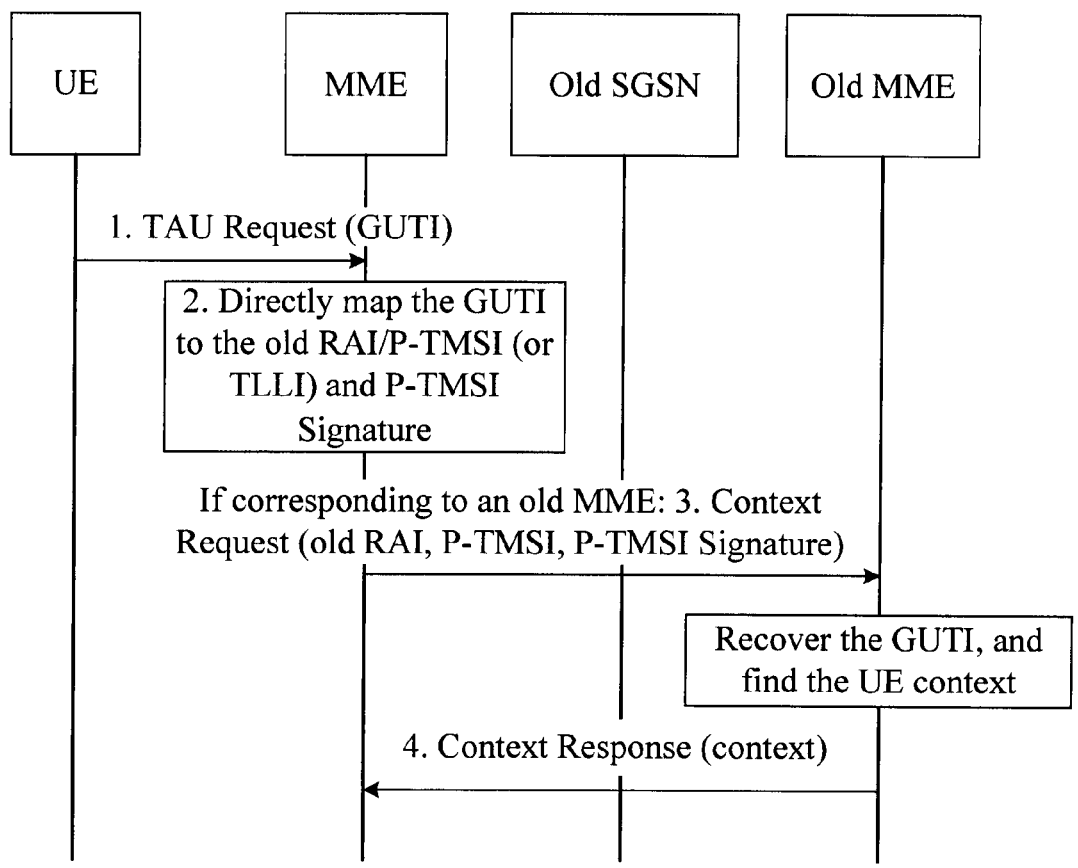
FIG. 3 is a schematic flowchart of an access method according to a fourth embodiment of the present invention.

The difference between this embodiment and the third embodiment lies in that, in this embodiment, the MME directly maps the GUTI. In this embodiment, the MME maps or reconstructs the GUTI into the old RAI/P-TMSI (or TLLI)/P-TMSI Signature or old RAI/P-TMSI, or the P-TMSI may also be in the form of TLLI, and the MME obtains the context from the old entity, for example, an old MME or old SGSN, by using the old RAI/P-TMSI (or TLLI)/P-TMSI Signature. If the old entity is an old MME, the old MME maps or reconstructs the old RAI/P-TMSI into a GUTI so as to obtain the UE context; and if the old entity is an old SGSN, the old SGSN directly finds the UE context according to the old RAI/P-TMSI (or TLLI), P-TMSI Signature, for which reference may be made to FIG. 3.

Embodiment 5

The difference between this embodiment and the third embodiment lies in that, in this embodiment, after it is judged that the GUTI is a mapped GUTI, different operations are performed according to whether a corresponding old SGSN is an S4 SGSN or a Gn/Gp SGSN. In this embodiment, different operations are performed by an access node determined whether the old node is an MME/S4-SGSN or Gn/Gp SGSN. For example, when the UE accesses the MME by using the GUTI mapped from the old RAI/P-TMSI, a specific access method may be an Attach or TAU method. If the MME knows that the old SGSN is an S4 SGSN, for example, by querying a DNS, or according to that the interface is a GTP-v2 based interface, the MME sends a Context Request containing the GUTI or an Identification Request containing the GUTI to the old SGSN, and the old SGSN reconstructs the old RAI and P-TMSI from the GUTI, or reconstructs the old RAI and P-TMSI TLLI from the GUTI according to the GUTI, obtains the UE context by using the old RAI and P-TMSI or using the old RAI and/or TLLI, and returns the UE context or IMSI to the MME. If the MME knows that the old SGSN is a Gn/Gp SGSN such as a Pre-R8 SGSN, for example, by querying a DNS, or according to that the interface is a GTP-v1 or v0 based interface, the MME reconstructs the old RAI/P-TMSI (or TLLI), and sends an SGSN Context Request (old RAI, P-TMSI or TLLI) or an Identification Request (old RAI, P-TMSI or TLLI) to the old SGSN, and the old SGSN finds the UE context by using the old RAI and P-TMSI (or TLLI) and returns the UE context to the MME.

Figure 4:
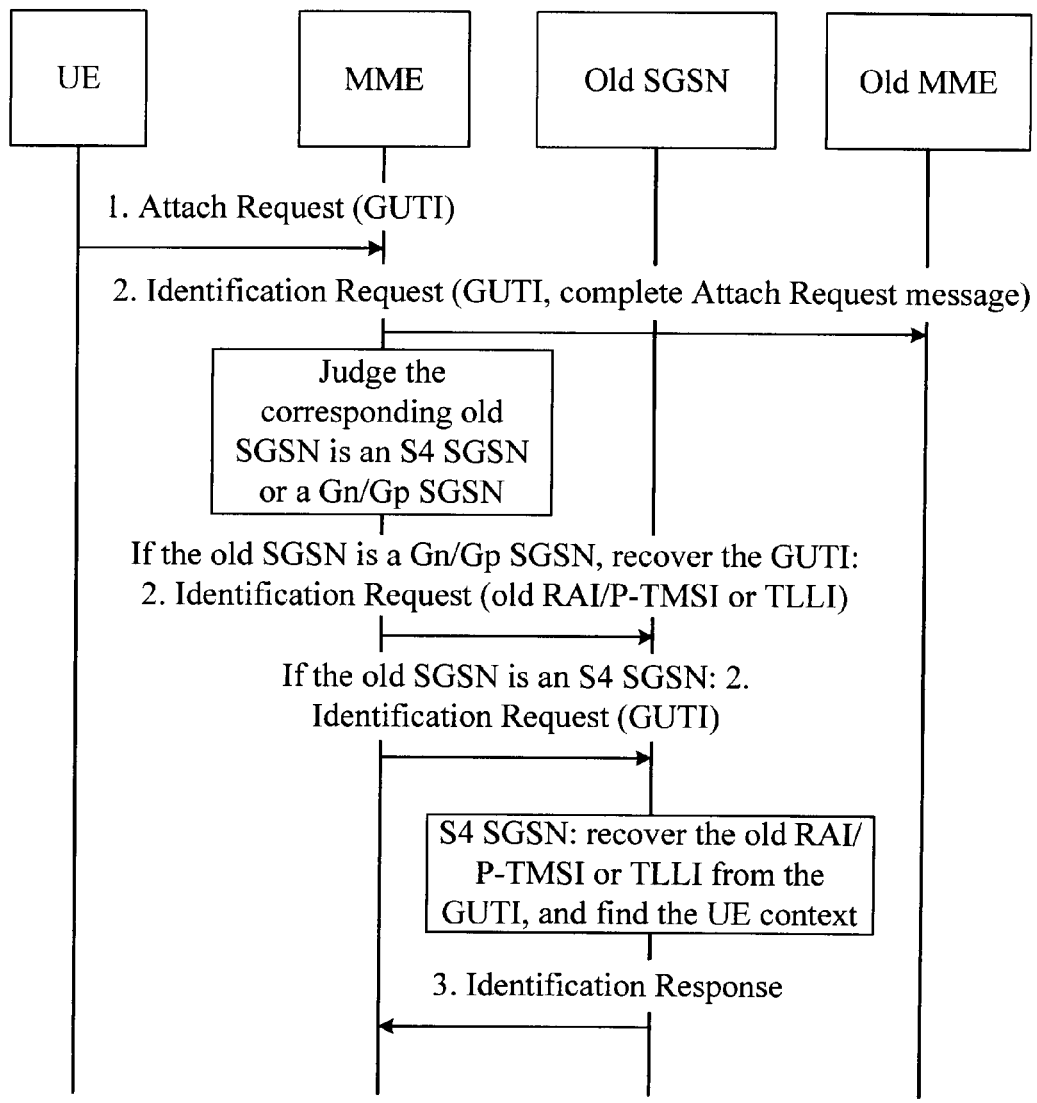
FIG. 4 is a schematic flowchart of an access method according to a fifth embodiment of the present invention.

Referring to FIG. 4, if during SAE Attach, the TIN of the UE is set as P-TMSI or TLLI or a temporary identity used by the UE during a previous Detach process in a 2G/3G network, the UE needs to use a GUTI mapped from the old RAI/P-TMSI (P-TMSI may also be TLLI) to access the SAE system; after receiving the mapped GUTI, the MME may directly reconstruct the old RAI/P-TMSI (or TLLI) from the mapped GUTI, or judge whether the old SGSN is an S4 SGSN or a Gn/Gp SGSN. If the old SGSN is an S4 SGSN, the UE may obtain the IMSI and context from the S4 SGSN through an Identification Request (GUTI, complete Attach Request message), and the S4 SGSN reconstructs the old RAI/P-TMSI (or TLLI) from the GUTI, and finds the UE context and returns the IMSI. If the old SGSN is a Gn/Gp SGSN, the MME uses the reconstructed old RAI/P-TMSI (or TLLI) to obtain information from the old SGSN through an Identification Request carrying the old RAI/P-TMSI (or TLLI). Definitely, if a temporary identity allocated by the accessing RAT exists, the UE may also use the temporary identity allocated by the accessing RAT during the Attach process, regardless of the indication of the TIN; and if no temporary identity allocated by the accessing RAT exists, a temporary identity of another RAT is used, or if no temporary identity of any RAT exists, the IMSI is used for access. If the GUTI is the real GUTI, the Identification Request message may need to carry a complete Attach Request message from the UE, so as to enable the old MME to perform integrity protection validation; and if the MME finds that the GUTI is a mapped GUTI, the MME does not need to carry the Attach Request message in the Identification Request message sent to the SGSN, and needs to perform security validation on the UE.

As for the security-related problem, if the Additional GUTI or Additional RAI/P-TMSI carried by the UE indicates that the UE locally has the context, the UE performs a security process such as integrity protection validation locally, so that an access entity, for example, an MME or SGSN, does not need to require the old entity indicated by the TIN, for example, an old MME or old SGSN, to perform integrity protection validation, and if the UE already performs integrity protection validation locally, the access entity carries information indicating that the UE is already validated in the Context Request, the old entity does not need to validate the UE. Otherwise, if the UE does not have the UE context in the local access entity, and the old entity indicated by the TIN and the access entity are the same RAT, the access entity may require the old entity to perform integrity protection validation on the UE, for example, the access entity sends the message sent by the UE to the old entity for validation by the old entity. So, if the Additional GUTI or Additional RAI/P-TMSI carried by the UE indicates that the UE locally has the context, the access entity may not require the old entity to perform the security process on the UE, for example, the access entity does not send the message sent by the UE to the old entity; alternatively, the access entity requires the old entity to perform the security process on the UE, but if the old entity cannot perform the validation (for example, the old entity and the access entity are not the same RAT), the old entity returns information indicating that the validation is not successful or is not completed, so as to require the access entity to validate the UE. Moreover, if the TIN of the UE indicates "P-TMSI" or "TLLI", the UE needs to carry the P-TMSI Signature during Attach or TAU/RAU access, so as to perform security validation on the UE, that is, the access entity sends the P-TMSI Signature to the old entity to validate the UE; otherwise, if the TIN of the UE indicates "GUTI", the UE needs to carry the P-TMSI Signature when accessing a 2G/3G network, because a part of information of the GUTI needs to be mapped to the P-TMSI Signature.

Embodiment 6

The difference between this embodiment and the third embodiment lies in that, in the third embodiment, the UE accesses an MME by using the GUTI, while in this embodiment, the UE carries the old RAI/P-TMSI/P-TMSI Signature to access an SGSN, where P-TMSI may also be TLLI. When the UE carries the old RAI/P-TMSI (or TLLI)/P-TMSI Signature to access the SGSN, the SGSN or DNS finds an old MME or old SGSN according to the difference between the real old RAI/P-TMSI (or TLLI)/P-TMSI Signature and the mapped identity, for example, difference between a bit of the MMEGI and a bit of the LAC. The SGSN may always obtain the context from the old entity by using the old RAI/P-TMSI/P-TMSI Signature. If the old entity is an MME, the SGSN sends an SGSN Context Request containing the old RAI, P-TMSI/TLLI, and P-TMSI Signature, to the old MME, and the old MME reconstructs a GUTI, finds and returns the UE context, and returns EPS Context or 2G/3G Context according to the interface or the content of the Context Request.

Figure 5:
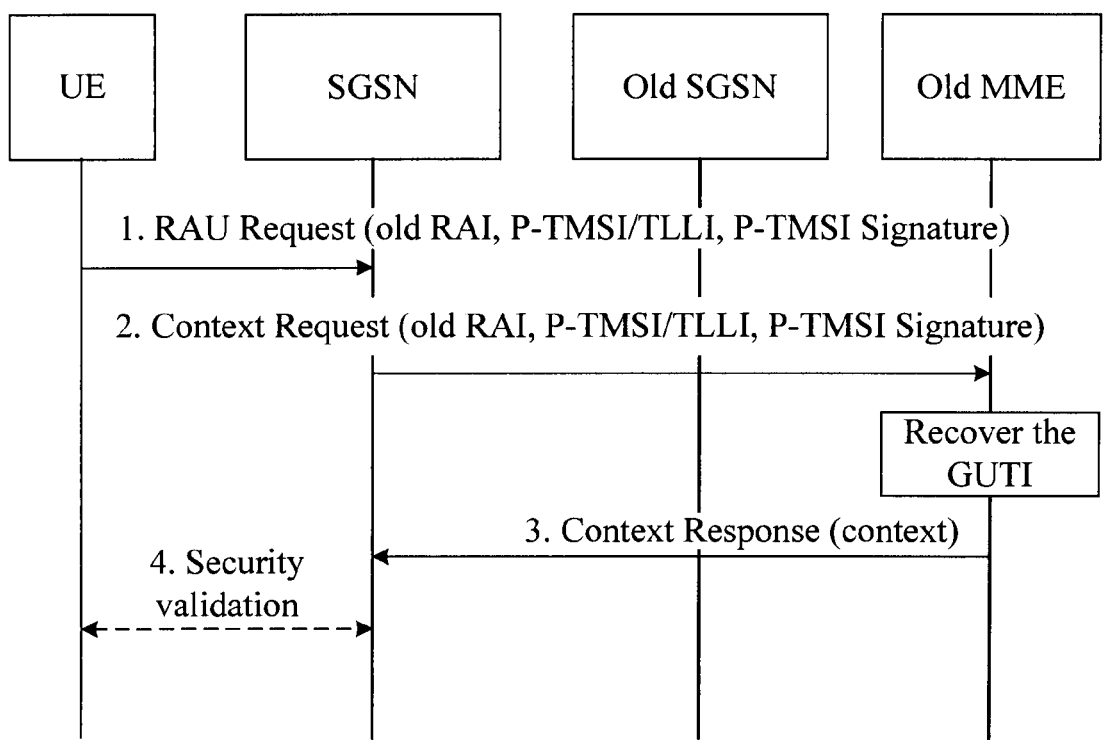
FIG. 5 is a schematic flowchart of an access method according to a sixth embodiment of the present invention.

Referring to FIG. 5, the UE accesses the SGSN by sending an RAU Request message, that is, by using the old RAI, P-TMSI/TLLI, and P-TMSI Signature. If the UE uses the old RAI, P-TMSI/TLLI, and P-TMSI Signature mapped from the GUTI for access, the SGSN finds the address of the old MME, and sends a Context Request carrying (old RAI, P-TMSI/TLLI, P-TMSI Signature) message to the old MME, and the old MME reconstructs the GUTI according to the old RAI, P-TMSI/TLLI, and P-TMSI Signature, finds and returns the UE context. Moreover, since the old MME does not have P-TMSI Signature information, the UE may be validated by using the following methods.

1. The old MME carries information indicating that the security of the UE is not validated in the returned Context Response, for example, carries a Cause value of 'P-TMSI signature mismatch', so that the SGSN revalidate the UE.

2. Alternatively, if the SGSN does not have the UE context and the SGSN knows that the old node corresponding to the old RAI, P-TMSI/TLLI, and P-TMSI Signature indicated by the TIN is an old MME, the SGSN always validates the UE, and carries "MS Validated" information in the Context Request sent to the old MME to indicate that the validation of the UE is already successful. If the SGSN has the UE context, and the UE context can be found by using the Additional RAI/P-TMSI, the SGSN firstly validates the UE, and if the validation is successful, the SGSN carries "MS Validated" information in the Context Request sent to the old MME to indicate that the UE already passes the validation.

Embodiment 7

Figure 6:
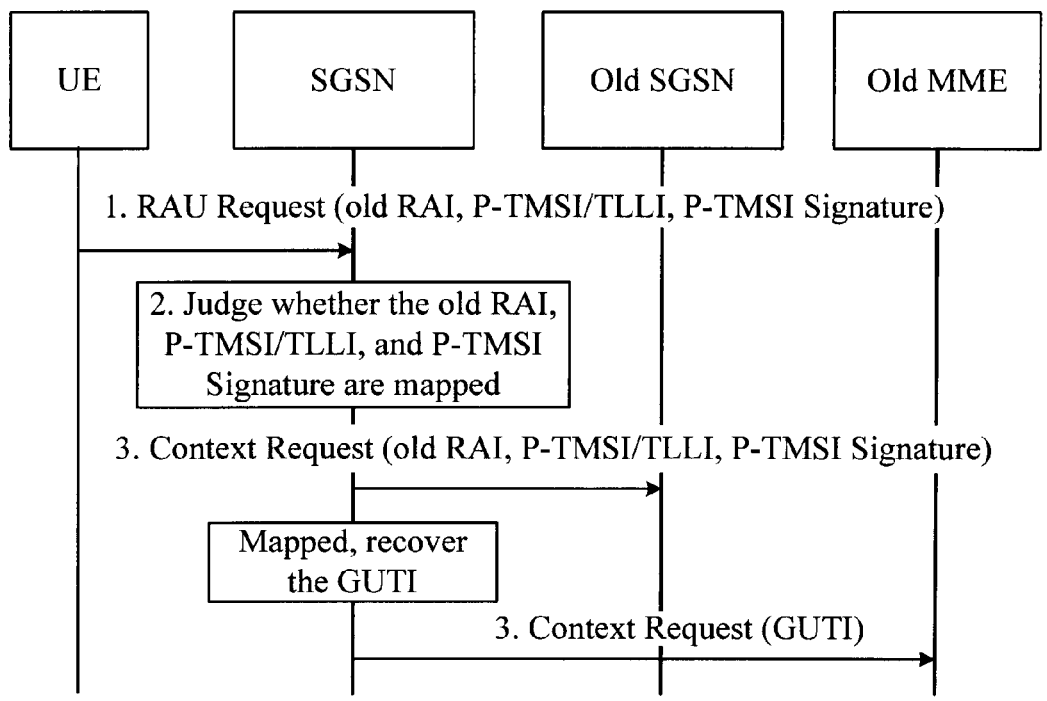
FIG. 6 is a schematic flowchart of an access method according to a seventh embodiment of the present invention.

The difference between this embodiment and the sixth embodiment lies in that, in the sixth embodiment, the old MME reconstructs the GUTI from the old RAI/P-TMSI/P-TMSI Signature, where P-TMSI may be TLLI. In this embodiment, if the old entity is an old MME, the SGSN reconstructs the GUTI from the old RAI/P-TMSI (or TLLI)/P-TMSI Signature. Referring to FIG. 6, the SGSN knows whether the old entity is an MME or an SGSN, and if the old entity is an MME, the S4 SGSN reconstructs the GUTI, and sends a Context Request (GUTI) to the old MME, and the old MME finds the UE context according to the GUTI, and returns the UE context.

The security problem is similar to that in the third to sixth embodiments, and if the SGSN locally has the UE context, the SGSN validates the P-TMSI Signature; and if the SGSN does not have the UE context and finds that the old entity is an MME, the SGSN always initiates a security process, and the SGSN reconstructs the GUTI, and requests the old MME for the UE context.

The access node may distinguish whether a temporary identity is an original temporary identity or a mapped identity, and a DNS may also be used to analyze the temporary identity, and then feed back to the access node whether the temporary identity is a mapped identity. If the address of the old node translated by the access node and the DNS is wrong, the translated old node continues finding the real old node after receiving the Context Request, and relays the message to the real old node.

Moreover, in the prior art, the UE may also carry an Additional TMSI (additional temporary identity), that is, the UE carries an Additional GUTI when accessing the SAE network, and carries an Additional old RAI/P-TMSI when accessing the 2G/3G network, where P-TMSI may also be TLLI. The function of the Additional TMSI is finding the UE context that possibly exists in the access RAT entity as possible, and obtaining the context by using the temporary identity indicated by the TIN, so that the obtained context can be directly combined with the UE context in the current RAT entity. Otherwise, the access RAT needs to query again whether the current RAT entity has the UE context according to the IMSI information in the obtained context, and then combines the contexts, which leads to higher complexity. In fact, the Additional TMSI does not need to be carried in the following cases so as to save the air interface resources: periodic location update (Periodic TAU or Periodic RAU) or TAU or RAU in a handover process; or the temporary identity indicated by the TIN is consistent with the Additional temporary identity, that is, the TIN indicates the temporary identity of the access RAT; or the UE has the temporary identity of the access RAT during the Attach process.

Through the above embodiments of the present invention, the processing by each node on the temporary identity is specified. The following effects can be achieved.

The real GUTI can be distinguished from the mapped GUTI, and the real old RAI/P-TMSI (or TLLI) can be distinguished from the mapped old RAI/P-TMSI (or TLLI). For example, a bit is set in the LAC and the MMEGI, which is always 0 in the LAC, and always 1 in the MMEGI.

When the UE uses the GUTI mapped from the old RAI/P-TMSI to access an SAE network, the eNodeB knows through distinguishing that the UE uses the old RAI/P-TMSI for access, and selects an MME corresponding to the NRI as possible; or the eNodeB determines, by detecting whether the LAC is configured, whether to select the MME corresponding to the NRI or reselect an MME.

When the UE uses the GUTI mapped from the old RAI/P-TMSI to access an MME, the MME knows that the GUTI is a mapped GUTI, reconstructs the old RAI/P-TMSI/TLLI, finds the old SGSN by using the old RAI and NRI, and sends a Context Request message (old RAI, P-TMSI/TLLI) to the old SGSN, and the old SGSN finds the UE context by using the old RAI and P-TMSI/TLLI, and returns the UE context to the MME.

Alternatively, when the UE uses the GUTI mapped from the old RAI/P-TMSI to access an MME, the MME knows that the GUTI is a mapped GUTI, and queries whether the old SGSN is an S4 SGSN or a Gn/Gp SGSN. If the old SGSN is an S4 SGSN, the MME sends a Context Request carrying the GUTI or an Identification Request to the old SGSN, and the old SGSN reconstructs the old RAI, and P-TMSI/TLLI from the GUTI, finds the UE context by using the old RAI and P-TMSI/TLLI, and returns the UE context to the MME. If the old SGSN is a Gn/Gp SGSN, the MME reconstructs the old RAI/P-TMSI/TLLI, and sends a Context Request carrying (old RAI, P-TMSI/TLLI) to the old SGSN, and the old SGSN finds the UE context by using the old RAI and P-TMSI/TLLI, and returns the UE context to the MME.

The Additional TMSI may not be necessary during TAU/RAU in a handover process or Periodic TAU/RAU, or when the temporary identity indicated by the TIN is consistent with the Additional temporary identity, or when the UE has the temporary identity of the access RAT during the Attach process.

When the MME and SGSN of the combined node belong to different PLMNs, or when an MME and an SGSN of different PLMNs establish an ISR, the UE may carry two PLMN-ids or configurations so as to enable the RAN node to select a corresponding CN node.

By distinguishing the identity carried by the UE is allocated by which RAT, the RAN node or access node can perform corresponding proper processing, so as to prevent selection of a wrong node or sending inconsistent parameters to the corresponding node.

In an embodiment of the present invention further provides a method for allocating a network resource node to a UE, which includes:

obtaining, by a network, a mapping attribute of a temporary identity carried by a UE; and allocating, by the network, a network resource node to the UE according to the mapping attribute of the temporary identity.

Specifically, the obtaining, by the network, the mapping attribute of the temporary identity carried by the UE is: judging, by the network, whether the UE identity is allocated by the network or mapped.

A detailed implementation is described as follows:

when the network accessed by the UE is an SAE network, the obtaining, by the network, the mapping attribute of the identity carried by the UE is: judging, by an eNodeB of the SAE network, whether a GUMMEI carried by the UE or an MMEGI in the GUMMEI is allocated by the SAE network or mapped;

if the GUMMEI or MMEGI is allocated by the SAE network, the allocating, by the network, the network resource node to the UE according to the mapping attribute of the identity is: selecting, by the eNodeB, an MME according to the GUMMEI or according to the MMEGI and an MMEC; and if the GUMMEI or MMEGI is mapped, the allocating, by the network, the network resource node to the UE according to the mapping attribute of the identity is: selecting, by the eNodeB, an MME according to an MCC, an MNC and an MMEC in the GUMMEI; or selecting, by the eNodeB, an MME according to the MMEC in the GUMMEI.

Alternatively, the method may also be implemented in the following manner:

when the network accessed by the UE is an SAE network, the obtaining, by the network, the mapping attribute of the identity carried by the UE is: judging, by an MME of the SAE network, whether a GUTI carried by the UE is allocated by the SAE network or mapped;

if the GUTI is allocated by the SAE network, before the allocating, by the network, the network resource node to the UE according to the mapping attribute of the identity, the method further includes: obtaining, by the MME, a UE context from an old MME by using the GUTI; and if the GUTI is mapped, before the allocating, by the network, the network resource node to the UE according to the mapping attribute of the identity, the method further includes: reconstructing, by the MME, an old RAI/P-TMSI from the GUTI, and obtaining the UE context from an old SGSN by using the old RAI/P-TMSI, or reconstructing, by the MME, an old RAI/TLLI from the GUTI, and obtaining the UE context from the old SGSN by using the old RAI/TLLI.

Corresponding to the above description of the method embodiments, an embodiment of the present invention further provides a UE, which does not perform integrity protection on an access message when accessing an SAE system by using a mapped GUTI.

Figure 7:
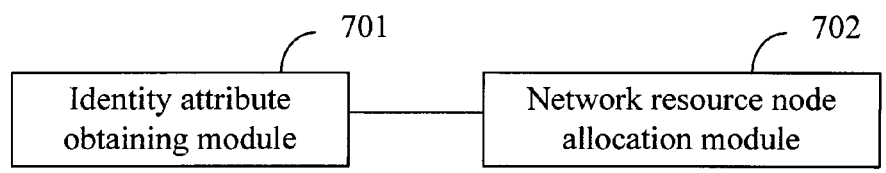
FIG. 7 is a schematic structural view of a network device according to an embodiment of the present invention.

Referring to FIG. 7, a network device includes an identity attribute obtaining module 701 and a network resource node allocation module 702. The identity attribute obtaining module 701 is configured to distinguish whether a UE uses a mapped temporary identity or an real temporary identity. The real temporary identity is an identity allocated by the network side. The network node may be an RAN node.

The network resource node allocation module 702 is configured to allocate a network resource node to the UE according to the attribute of the temporary identity of the UE, that is, according to whether the identity of the UE is allocated by the network or mapped. The network side node is an MME, an SGSN or a CN node.

Through the descriptions of the preceding embodiments, those skilled in the art may understand that the present invention may be implemented by using hardware only or by using software and a necessary universal hardware platform. Based on such understandings, all or part of the technical solution under the present invention that makes contributions to the prior art may be essentially embodied in the form of a software product. The software product may be stored in a storage medium, which can be a magnetic disk, a Compact Disk Read-Only Memory (CD-ROM), a Read-Only Memory (ROM) or a Random Access Memory (RAM). The software product includes a number of instructions that enable a computer device (personal computer, server, or network device) to execute the methods provided in the embodiments of the present invention.

It should be noted that the above descriptions are merely some exemplary embodiments of the present invention, and person having ordinary skill in the art may make various improvements and refinements without departing from the spirit of the invention. All such modifications and refinements are intended to be covered by the present invention.

What is claimed is:

1. A method for access, comprising:
 receiving, by an old Mobility Management Entity (MME), an old Routing Area Identification (RAI) and a Packet Temporary Mobile Subscriber Identity (P-TMSI) from a Serving General Packet Radio Service (GPRS) Support Node (SGSN), wherein the old RAI and the P-TMSI is sent from the SGSN according to an address of the old MME, and the address of the old MME is found by the SGSN according to the old RAI and the P-TMSI carried by a user equipment (UE);
 reconstructing, by the old MME, a Global Unique Temporary Identity (GUTI) from the old RAI and the P-TMSI;
 obtaining, by the old MME, a UE context of the UE according to the GUTI; and
 returning, by the old MME, the UE context of the UE to the SGSN.

2. A communication system, comprising:
   a Serving General Packet Radio Service (GPRS) Support Node (SGSN) and an old Mobility Management Entity (MME);
   wherein the SGSN is configured to find an address of the old MME according to an old Routing Area Identification (old RAI) and a Packet Temporary Mobile Subscriber Identity (P-TMSI) carried by a user equipment (UE), when the UE accesses a Second Generation/3rd Generation (2G/3G) network from a System Architecture Evolution (SAE) network; and
   wherein the SGSN is configured to send the old RAI and the P-TMSI to the old MME;
   wherein the old MME is configured to reconstruct a Global Unique Temporary Identity (GUTI) from the old RAI and the P-TMSI;
   wherein the old MME is configured to obtain a UE context of the UE according to the GUTI and return the UE context to the SGSN.

3. A network device, comprising:
   an identity attribute obtaining module, configured to obtain an attribute of a Global Unique Temporary Identity (GUTI) of a user equipment (UE) currently accessing a System Architecture Evolution (SAE) network, wherein the attribute of the GUTI of the UE indicates whether the GUTI of the UE is allocated by the SAE network or is mapped from a temporary identity of a Second Generation/Third Generation (2G/3G) network; and
   a network resource node allocation module, configured to allocate a network resource node to the UE according to the attribute of the GUTI of the UE.

4. The network device according to claim 3, wherein the network resource node allocation module is configured to:
   select a first Mobility Management Entity (MME) according to a Globally Unique Mobility Management Entity Identifier (GUMMEI) in the GUTI, or according to a Mobility Management Entity Group Identity (MMEGI) and a Mobility Management Entity Code (MMEC) in the GUTI, when the GUTI is allocated by the SAE network; and
   select a second MME according to a Mobile Country Code (MCC), a Mobile Network Code (MNC), and a Mobility Management Entity Code (MMEC) in the GUMMEI in the GUTI, or according to the MMEC in the GUMMEI in the GUTI, when the GUTI is mapped.

5. An Mobility Management Entity (MME), comprising:
   a receiver, configured to receive an old Routing Area Identification (RAI) and a Packet Temporary Mobile Subscriber Identity (P-TMSI) from a Serving General Packet Radio Service (GPRS) Support Node (SGSN), wherein the old RAI and the P-TMSI is sent according to an address of an old MME, and wherein the address of the old MME is found by the SGSN according to the old RAI and the P-TMSI carried by a user equipment (UE);
   a processor, configured to reconstruct a Global Unique Temporary Identity (GUTI) from the old RAI and the P-TMSI and obtain a UE context of the UE according to the GUTI; and
   a transmitter, configured to transmit the UE context of the UE to the SGSN.

* * * * *